(12) United States Patent
Schantz

(10) Patent No.: US 6,845,253 B1
(45) Date of Patent: Jan. 18, 2005

(54) ELECTROMAGNETIC ANTENNA APPARATUS

(75) Inventor: Hans Gregory Schantz, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 576 days.

(21) Appl. No.: 09/670,792

(22) Filed: Sep. 27, 2000

(51) Int. Cl.[7] ................................................. H04Q 1/38
(52) U.S. Cl. ...................... 455/575.7; 455/269; 455/80; 343/700 R
(58) Field of Search .......................... 455/80, 13.3, 25, 455/82, 575.1, 550.1, 97, 121, 279.1, 328, 15, 16, 23, 19, 562.1, 129, 269, 575.7; 370/324, 503, 280, 294–296, 301, 302, 307, 320, 317, 321, 441, 512; 343/846, 700 R, 872, 878, 882.795, 807, 830, 893, 896, 897, 898, 769, 770, 771, 767, 795, 810, 816, 820; 333/123, 24 R

(56) References Cited

U.S. PATENT DOCUMENTS

| | | |
|---|---|---|
| 2,239,724 A | 2/1941 | Lindenblad |
| 4,641,317 A | 2/1987 | Fullerton ........................ 375/1 |
| 4,743,906 A | 5/1988 | Fullerton ....................... 342/27 |
| 4,813,057 A | 3/1989 | Fullerton ....................... 375/37 |
| 4,843,403 A * | 6/1989 | Lalezari et al. .............. 343/767 |
| 4,979,186 A | 12/1990 | Fullerton ....................... 375/23 |
| 5,319,377 A | 6/1994 | Thomas et al. |
| 5,363,108 A | 11/1994 | Fullerton ....................... 342/27 |
| 5,523,767 A * | 6/1996 | McCorkle .................... 343/810 |
| 5,677,927 A | 10/1997 | Fullerton et al. ........... 375/200 |
| 5,687,169 A * | 11/1997 | Fullerton ...................... 370/324 |
| 5,734,350 A * | 3/1998 | Deming et al. .............. 343/700 |
| 5,832,035 A | 11/1998 | Fullerton ...................... 375/210 |
| 5,872,546 A * | 2/1999 | Ihara et al. ................... 343/795 |
| 6,278,410 B1 * | 8/2001 | Soliman et al. .............. 343/769 |

OTHER PUBLICATIONS

Kraus, John D.; *Anntennas*; Second Edition; McGraw–Hill, Inc., 1988.

Agrawall, Narayan Prasad; Kumar, Girish; and Ray, K.P.; "Wide–Band Planar Monopole Antennas"; IEEE Transactions on Antennas and Propagation; vol. 46, No. 2; Feb. 1998.

Schantz, Hans Gregory. "The Energy Flow and Frequency Spectrum About Electric and Magnetic Dipoles"; Ph.D. Dissertation, University of Texas; Aug. 1995.

* cited by examiner

Primary Examiner—Edward F. Urban
Assistant Examiner—C. Chow
(74) Attorney, Agent, or Firm—Law Office of Donald D. Mondul

(57) ABSTRACT

An apparatus for transferring electromagnetic energy intermediate a host device and a medium or free space adjacent to the apparatus in an impulse radio system includes: (a) an energy guiding means for guiding the electromagnetic energy; the energy guiding means is connected with the host device; (b) an electromagnetic energy channeling structure effecting the transferring and including a plurality of gap interfaces; and (c) a transition means for coupling the energy guiding means with at least one gap interface of the plurality of gap interfaces. The transition means conveys the electromagnetic energy intermediate the energy guiding means and the at least one gap interface. The at least one gap interface intersects the transition means in a substantially continuous curve in selected planes intersecting the gap interface and the transition means.

50 Claims, 22 Drawing Sheets

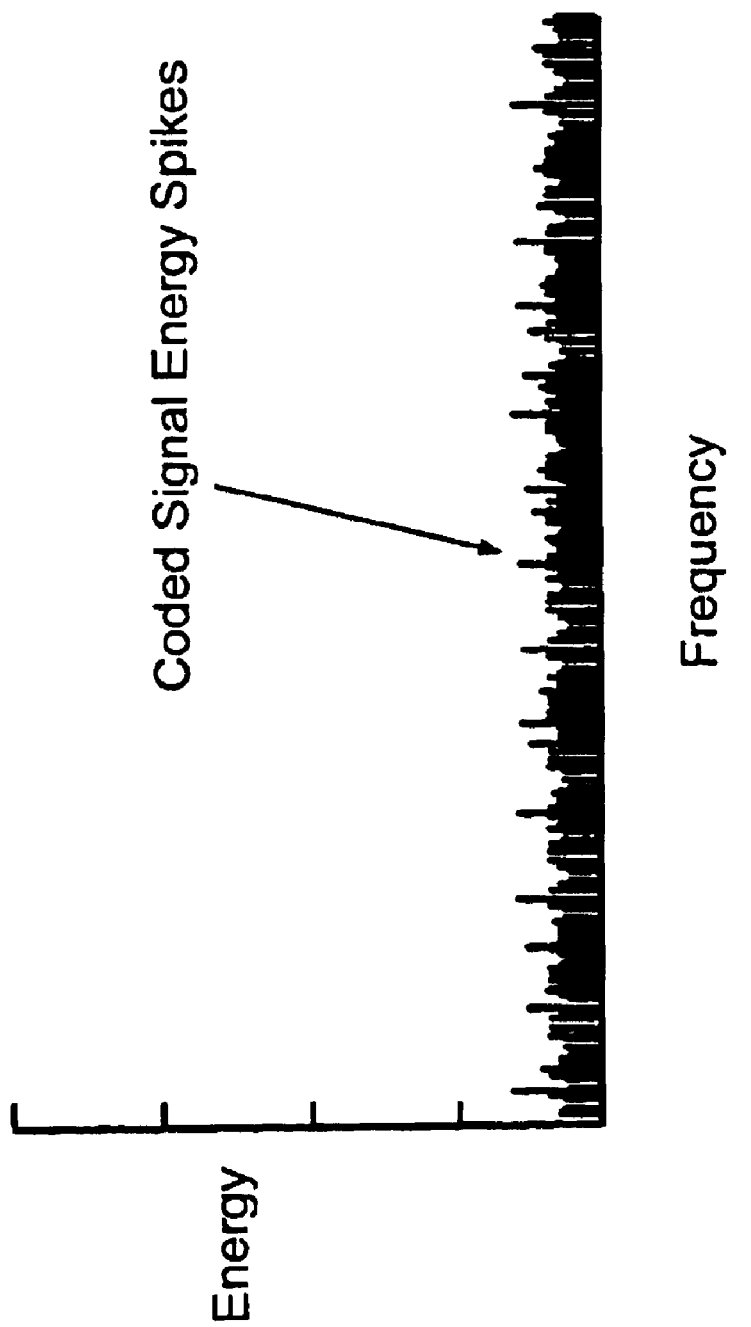

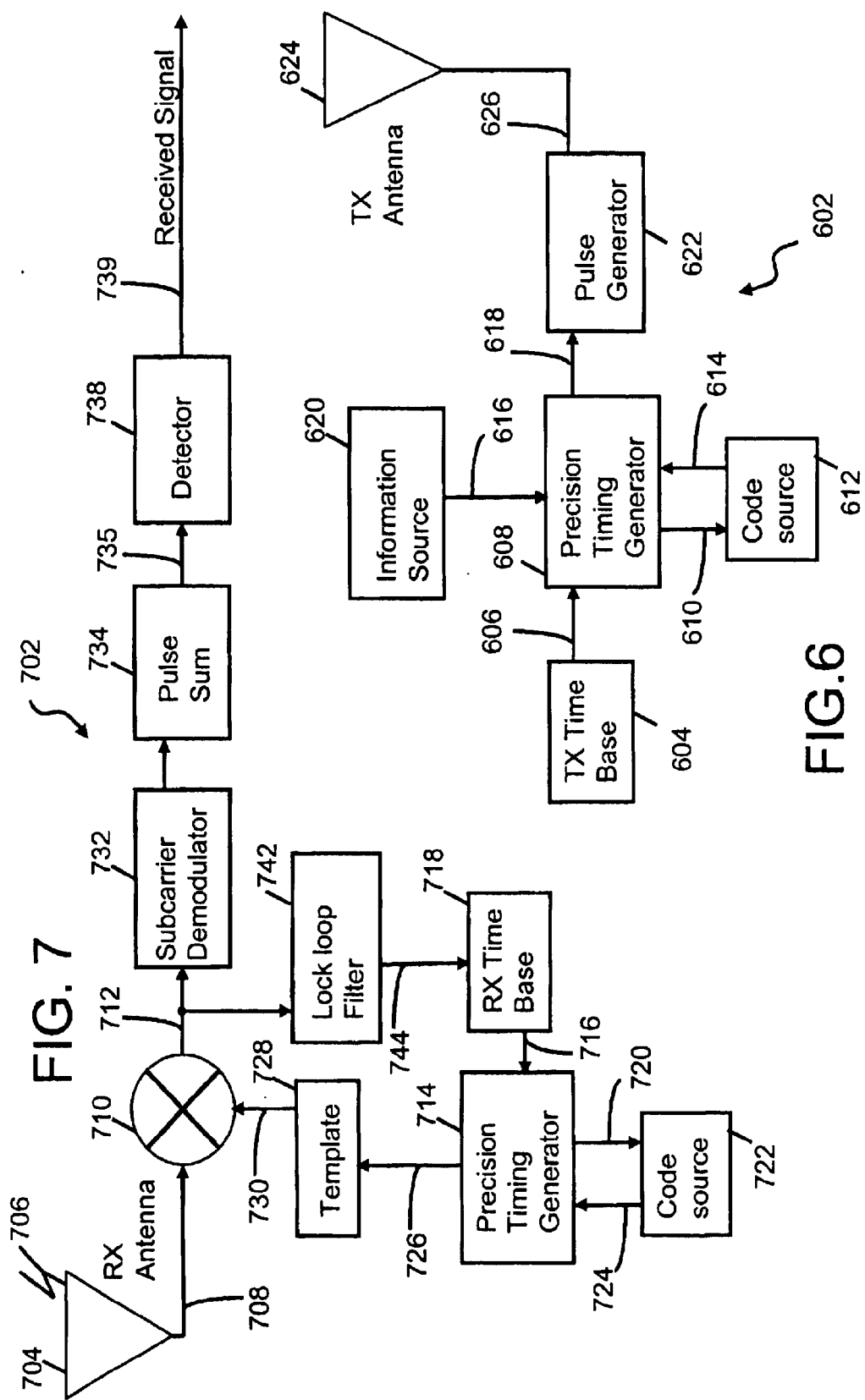

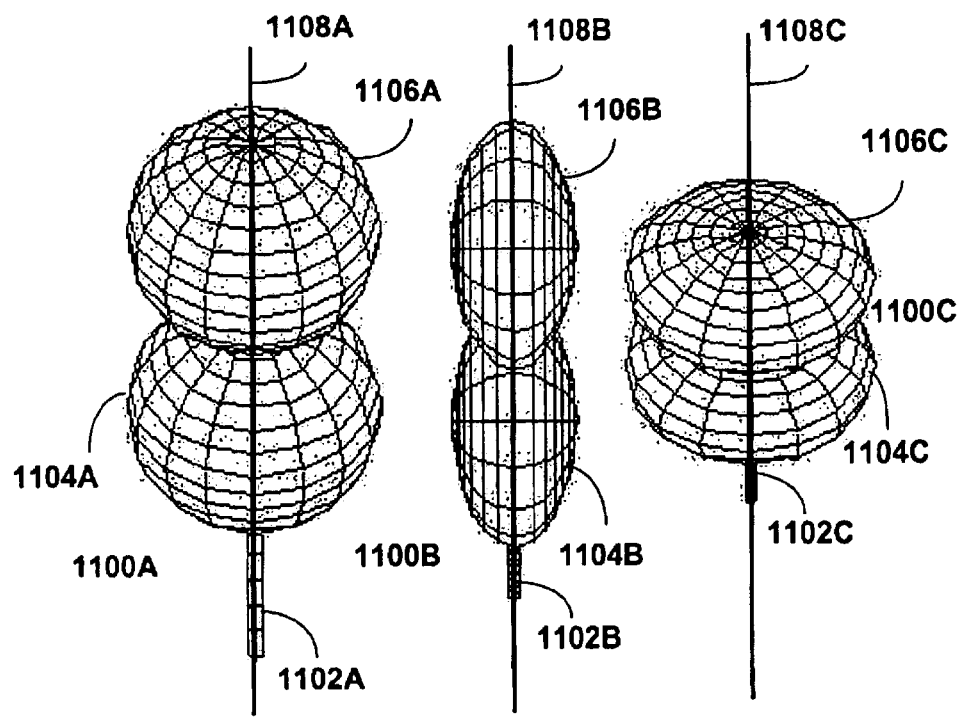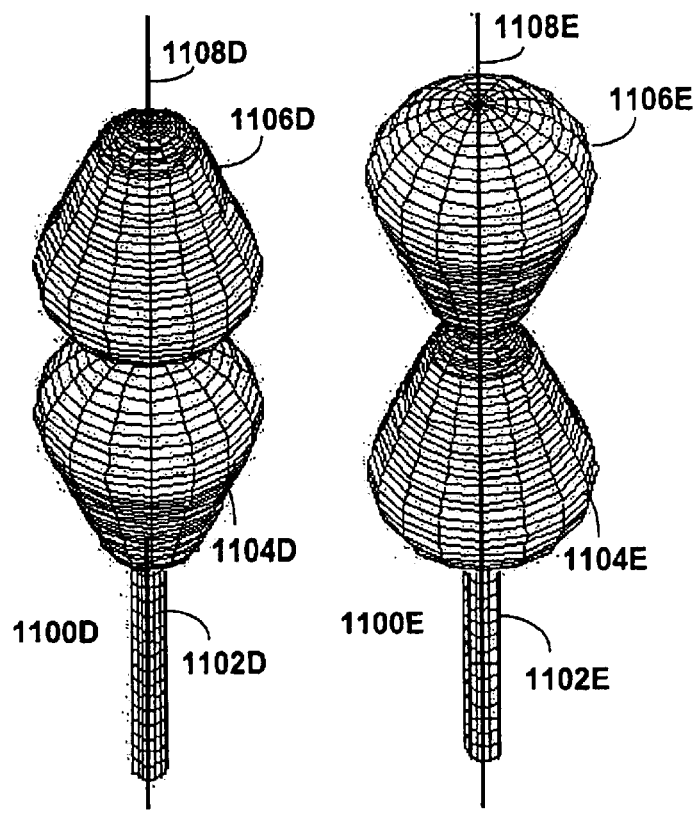
FIG. 11(A)   FIG. 11(B)   FIG. 11(C)
FIG. 11(D)   FIG. 11(E)

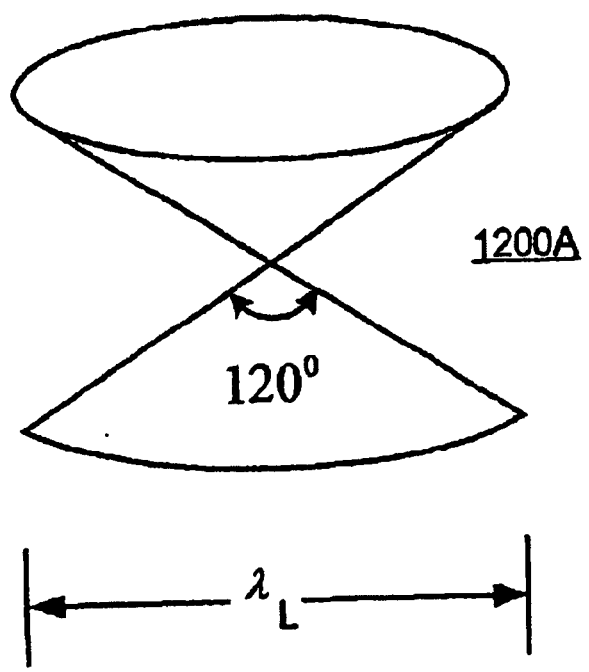 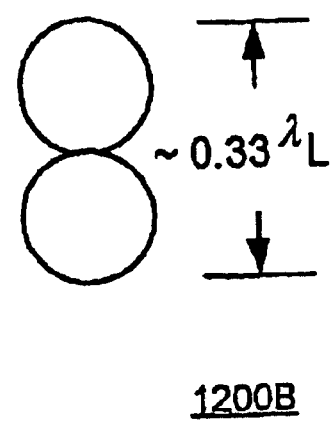
FIG. 12(A)
FIG. 12(B)

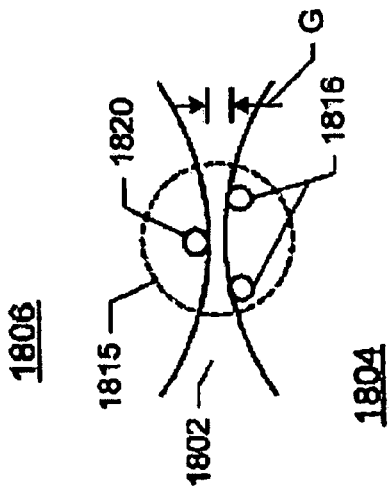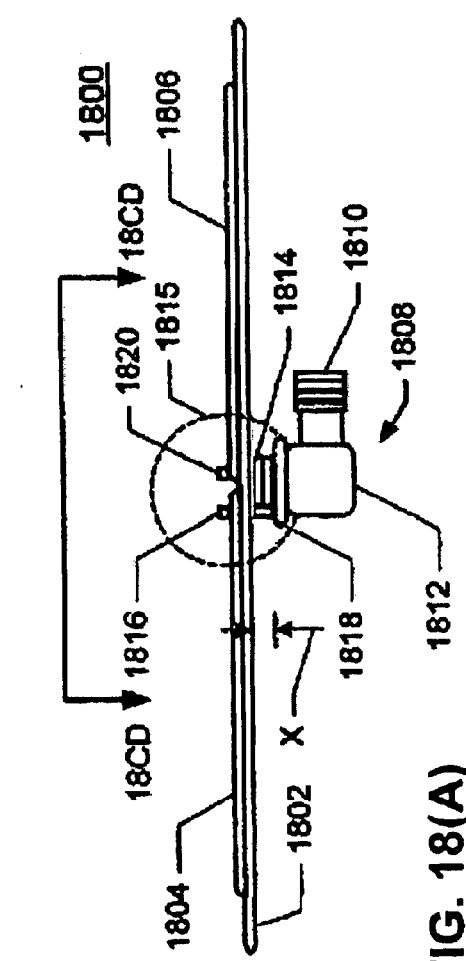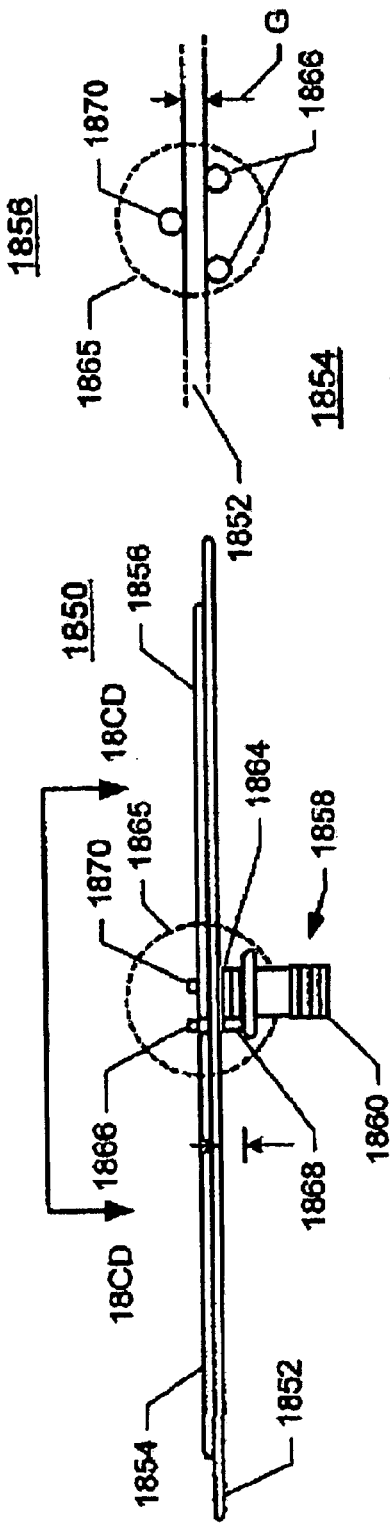

| Antenna | Properties | | | | | | |
|---|---|---|---|---|---|---|---|
| | Well-matched | Efficient | Non-dispersive | Omni-directional | Easy to Make | Small | |
| Bowtie | Not to 50 ohms | Yes | Yes | Yes | Yes | No | |
| Volcano Smoke | Yes | Yes | Yes | Yes | No | No | |
| TEM Horn | Yes | Yes | Yes | No | No | No | |
| Vivaldi Slot | Yes | Yes | Yes | No | Yes | No | |
| Log Periodic | Yes | Yes | No | No | No | No | |
| Spiral | Yes | Yes | No | No | No | No | |
| Conical Spiral | Yes | Yes | No | No | No | No | |
| Resistive Loaded | Yes | No | Yes | Yes | No | Yes | |
| Diamond Dipole | No | No | Yes | Yes | Yes | No | |
| Cotab | No | No | Yes | Yes | Yes | Yes | |
| CEO | Yes | Yes | Yes | Yes | Yes | Yes | |
| Spheriodal | Yes | Yes | Yes | Yes | No | Yes | |

FIG. 20

ELECTROMAGNETIC ANTENNA APPARATUS

BACKGROUND OF THE INVENTION

1. Field of the Invention

The present invention relates generally to electromagnetic energy radiation and reception, and especially relates to electromagnetic energy radiation and reception effected using impulse radio energy. Still more particularly the present invention provides an antenna suited for broadband energy radiation and reception, and particularly well suited for broadband energy radiation and reception employing impulse radio energy.

2. Related Art

Recent advances in communications technology have enabled an emerging revolutionary ultra wideband technology (UWB) called impulse radio communications systems (hereinafter called impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

Many applications for impulse radio technology, including communication applications, position determination applications, locating (e.g., radar) applications and other applications require lightweight, compact broadband antennas with omni-directional transmit/receive characteristics. As with any antenna, impedance matching to feed elements is necessary for efficient operation. Moreover, in the case of impulse radio technology applications, the antenna must not be subject to ringing in response to application of pulses—either in a transmit mode or in a receive mode.

Current antenna technology offers several undesirable alternatives to one interested in a small, well-matched, efficient, omni-directional ultra wideband (UWB) short pulse antenna: (1) a self-similar antenna (e.g., a bow tie antenna) that tends to be large and frequency dispersive; (2) a TEM horn antenna that tends to be bulky and highly directive; or (3) a resistively loaded antenna that will necessarily be lossy and inefficient. Existing spheroidal antennas like the volcano smoke antenna (FIG. 10) are difficult to manufacture. Existing UWB antennas like the biconical antenna are relatively large and, despite their stable impedance, are not well matched to 50Ω.

Kraus (John D. Kraus, *Antennas*, $2^{nd}$ edition; New York: McGraw Hill, 1988) briefly mentions a "double dish" antenna comprised of a pair of hemispherical dishes connected in tandem to form a dipole with planar elements facing away from each other. (Kraus; p. 63) The "double dish" configuration is presented as a step in evolving an antenna configuration from Kraus's "volcano smoke" antenna (FIG. 10) to a stub (monopole) antenna. Kraus' "double dish" antenna does not meet the performance criteria recognized herein as necessary for optimal performance in an impulse radio application. The sharp discontinuities in transitioning from a smooth curve to a substantially planar outwardly facing dish surface creates undesirable internal reflections in the "double dish" antenna.

The current art regarding ultra wideband (UWB) antennas teaches using element antennas such as monopoles, dipoles, conical antennas and bow-tie antennas for ultra wideband systems. However, they are generally characterized by low directivity and relatively limited bandwidth unless either end loading or distributed loading techniques are employed, in which case bandwidth is increased at the expense of radiation efficiency.

Conventional antennas are designed to radiate only over the relatively narrow range of frequencies used in conventional narrow band systems. Such narrow band systems may, for example, employ fractional bandwidths no more than about 25%. If an impulse signal, such as a signal of the sort employed for impulse radio purposes, is fed to such a narrow band antenna, the antenna tends to ring. Ringing severely distorts signal pulses and spreads them out in time. Impulse radio signals are preferably modulated by pulse timing, so such distortion of pulses is not desirable.

Broadband antennas are advantageous for many purposes, including their use with impulse radio systems. Conventional design in broadband antennas follows a commonly accepted principle that the impedance and pattern properties of an antenna will be frequency independent if the antenna shape is specified only in terms of angles. That is to say, a self-similar or self-complimentary antenna will be a broadband antenna. This principle explains known broadband antennas like biconical and bow tie antennas, but also applies to other broadband antennas like log periodic, log spiral, and conical spiral antennas.

All such prior art antennas rely on a variation of scale to achieve their broadband performance. A "smaller" scale section of the antenna radiates higher frequency components while a "larger" scale section of the antenna radiates lower frequency components. Because the radiation centers change location as a function of frequency, these antennas are inherently frequency dispersive; they radiate different frequency components from different parts of the antenna, resulting in a distorted impulse signal.

Throughout this description, it should be kept in mind that discussions relating to transmitting or transmissions apply with equal veracity to reception of electromagnetic energy or signals. In order to avoid prolixity, the present description will focus primarily on transmission characteristics of antennas, with the proviso that it is understood that reception of energy or signals is also inherently described.

A biconical antenna is a classic example of a prior art broadband antenna with an omni-directional pattern. A typical biconical antenna with a 60° half angle will have a 100Ω input with a voltage standing wave ratio (VSWR) of <2:1 over a 6:1 bandwidth. A significant drawback with such a biconical antenna is that such an antenna is typically implemented with a diameter equal to the wavelength at the lower frequency limit ($\lambda_L$) thus requiring that the antenna be $0.577\lambda_L$ in height. Because of similar design limitations, a typical monocone antenna will not provide a good match if it is much less than $0.22\lambda_L$ in diameter. In any event, a monocone antenna does not have very stable performance over a broad band. Antennas as large as the above described typical conical antennas (biconical and monoconical) often have difficulty radiating (i.e., transmitting) pulses without dispersion. In addition, such large antennas are difficult to fit into a small portable or hand held devices.

TEM horn antennas often suffer from frequency dispersion as well. Furthermore, a horn antenna is inherently a large structure, often several wavelengths in dimension. A horn antenna may be made smaller by dielectric loading, but such loading adds weight which is often undesirable. Further, a horn antenna is a directive antenna and cannot provide the omni-directional coverage required for many portable or mobile applications.

A TEM feed may be combined with a parabolic dish to create a ribbed horn "impulse radiating antenna" (IRA). Such antennas can have bandwidths on the order of a couple of decades, and very high gain, but their large size and high directivity make them inappropriate for portable or mobile use.

A "dish" antenna consisting of the rounded sides of two spherical hemispheres being driven against one another is a known antenna structure (e.g., Kraus' "double dish" antenna), but it is not known to be used for impulse radio broadband applications. Another prior art attempt to provide a spheroidal antenna is a "volcano smoke" antenna (see, Kraus; p. 63). The tapered feed of this antenna provides excellent matching, and the antenna does radiate omni-directionally, but the gradual transition required to yield such beneficial operating parameters makes the antenna bulky and difficult to manufacture.

Because spherical antennas must be fed by a radial waveguide, they often exhibit poor matching characteristics unless an elaborate and difficult-to-manufacture impedance matching structure is used. An impedance matching structure also tends to further impair antenna performance by making the antenna more likely to ring. It is very difficult to construct a feed that maintains a constant matched impedance over a broad bandwidth, something essential to an ultra wideband (UWB) antenna. It is a commonly accepted design criteria in electromagnetic applications, and especially in radio communication applications, that an antenna should match a 50Ω impedance feed providing signals to (or receiving signals from) the antenna. Some video applications require matching a 75Ω impedance feed.

Another prior known antenna structure drives a hemispherical antenna against a ground plane. Attempts by the inventor to employ such an antenna structure for broadband impulse radio resulted in an unacceptably large impedance mismatch.

Circular disc (planar) monopole antennas and elliptical disc (planar) monopole antennas have been evaluated to determine their respective bandwidths. (Agrawall, Kumar and Ray; "Wide-Band Planar Monopole Antennas"; IEEE Transactions on Antennas and Propagation, February 1998.) However, no regard was given to the suitability of such antennas for impulse radio applications. No regard was given to dispersion, ringing or phase performance of signals employing such circular disc antennas or elliptical disc antennas for impulse radio communication.

Resistive loading is an alternate technique commonly employed to achieve impedance matching in broadband antennas. Resistive loading succeeds in reducing reflection, but at the cost of throwing away typically around half the power that may be transmitted by an antenna. Such a design trade-off has become accepted in design approaches in prior art antennas. It has been generally believed that resistive loading must be employed for a small broadband antenna in order to achieve good impedance matching. Non-resistively loaded small ultra wideband antennas are known, but they tend to have poor impedance matching and high voltage standing wave ratios (VSWR's). A lower value for VSWR is a better value; the optimum value of VSWR is 1:1. The prior art teaches that resistive loading must be used in an element antenna in order to achieve wide bandwidth. It is commonly believed that high radiation efficiency and high bandwidth are mutually exclusive.

For a small hand held or portable system, it is desirable to have a well matched, efficient, physically small, UWB antenna that radiates non-dispersively and omni-directionally. It is particularly advantageous for an antenna to be easily made in large volumes with reliable repeatable quality. Not only are such antennas unknown to the present art, in fact, the current teaching is that such antennas are not physically realizable.

There is a need for a broadband antenna that is compact, efficiently matched to a feed structure and radiates omni-directionally.

In particular, there is a need for a broadband antenna that operates without ringing in response to application of a pulse signal.

SUMMARY OF THE INVENTION

An apparatus for transferring electromagnetic energy intermediate a host device and a medium or free space adjacent to the apparatus in an impulse radio system comprises: (a) an energy guiding means for guiding the electromagnetic energy; the energy guiding means is connected with the host device; (b) an electromagnetic energy channeling structure effecting the transferring and including a plurality of gap interfaces; and (c) a transition means for coupling the energy guiding means with at least one gap interface of the plurality of gap interfaces. The transition means conveys the electromagnetic energy intermediate the energy guiding means and the at least one gap interface. The at least one gap interface intersects the transition means in a substantially continuous curve in selected planes intersecting the at least one gap interface and the transition means.

An energy guiding means is preferably embodied in a structure that conveys electromagnetic energy. Examples of an energy guiding means include, by way of illustration and not by way of limitation, coaxial cable, stripline, microstrip, twin lead, twisted pair fiber optic cable, wave guide or other transmission line, or a connector or coupler that enables connection to a transmission line.

An energy channeling structure is preferably embodied in a structure that couples electromagnetic energy between an apparatus and an adjacent free space or medium. Examples of a channeling structure include, by way of illustration and not by way of limitation, radiating elements, receiving elements, reflectors, directors and horns.

A transition means is preferably embodied in a structure that receives radio frequency (RF) energy, transmits RF energy or receives and transmits RF energy. The terms "feed" or "feed region" are sometimes used to refer to a transition means.

A host radio is a RF device that receives RF energy, transmits RF energy or receives and transmits RF energy. An antenna may be integrally included with or within a host radio or that antenna may be situated remotely from the host radio at an arbitrary distance yet coupled with the host radio, such as by using an energy guiding means. The term "host radio" does not per se indicate any particular relation between a radio and an associated antenna. In particular, the term "host radio" does not preclude an antenna remotely located from a radio or standing alone with respect to a radio.

The inventor has discovered that the preferred construction of the electromagnetic energy channeling structure is in a spheroidal or ovoidal shape. The terms "spheroidal" or "ellipsoidal" are employed herein to indicate a three-dimensional element having a generally smoothly curved shape. In its most preferred embodiment, a "spheroidal" or "ellipsoidal" element presents planar sections oriented substantially symmetrically about at least one axis. Thus, a preferred embodiment of a "spheroidal" or "ellipsoidal" element presents a substantially continuously curved intersection with a gap interface in a planar section in an antenna. The curved intersection is bounded by termination loci substantially at the limit of or outside a feed region. The boundary of the "spheroidal" or "ellipsoidal" element departs from each termination locus in a substantially smooth, continuous curve to the other termination locus. The curve is substantially smooth and continuous in dimensions that are significant with regard to the wavelengths with which the element is employed.

The terms "ovoidal" or "elliptical" are employed herein to indicate a substantially two-dimensional, planar element having a generally smoothly curved shape. In its most preferred embodiment, an "ovoidal" or "elliptical" element is oriented substantially symmetrically about at least one axis. Thus, a preferred embodiment of an "ovoidal" or "elliptical" element presents a substantially continuously curved intersection with a gap interface in a plane in an antenna. The curved intersection is bounded by termination loci substantially at the limit of or outside a feed region. The boundary of the "ovoidal" or "elliptical" element departs from each termination locus in a substantially smooth, continuous curve to the other termination locus. The curve is substantially smooth and continuous in dimensions that are significant with regard to the wavelengths with which the element is employed.

It is therefore an object of the present invention to provide an apparatus for transferring electromagnetic energy intermediate a host device and a medium adjacent to the apparatus that is efficient in operation and easy to manufacture in production level quantities.

It is a further object of the present invention to provide an apparatus for transferring electromagnetic energy intermediate a host device and a medium adjacent to the apparatus that is compact and is matched to a feed structure.

It is yet a further object of the present invention to provide an apparatus for transferring electromagnetic energy intermediate a host device and a medium adjacent to the apparatus that radiates omni-directionally.

It is a still further object of the present invention to provide an apparatus for transferring electromagnetic energy intermediate a host device and a medium adjacent to the apparatus that operates without ringing in response to application of a pulse signal.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 3 illustrates the frequency domain amplitude of a sequence of time coded pulses.

FIG. 6 illustrates a representative impulse radio transmitter functional diagram.

FIG. 7 illustrates a representative impulse radio receiver functional diagram.

FIG. 8C illustrates the output of the correlator for each of the time offsets of FIG. 8B.

FIG. 11(A) through (E) illustrate representative embodiments of spheroidal dipole antenna structures.

FIG. 12 illustrates the relative sizes for a biconical dipole antenna (A) vis-à-vis a spheroidal dipole (B) in terms of lowest wavelength to be handled by the antenna.

FIG. 18(A) is a side view of a right angle coaxial connector feed structure with a planar antenna.

FIG. 18(B) is a side view of a straight coaxial connector feed structure with a planar antenna.

FIG. 18(C) is a top view of a curved feed interface arrangement for an antenna of the sort illustrated in FIG. 18(A) or FIG. 18(B) taken along Section 18CD—18CD of FIG. 18(A) or FIG. (B).

FIG. 18(D) is a top view of a straight feed interface arrangement for an antenna of the sort illustrated in FIG. 18(A) or FIG. 18(B) taken along Section 18CD—18CD of FIG. 18(A) or FIG. (B).

FIG. 20 is a table summarizing performance of various antennas vis-à-vis criteria considered important for a commercially successful impulse radio communication system antenna.

DETAILED DESCRIPTION OF THE EMBODIMENTS

Overview of the Invention

Figure 1B:
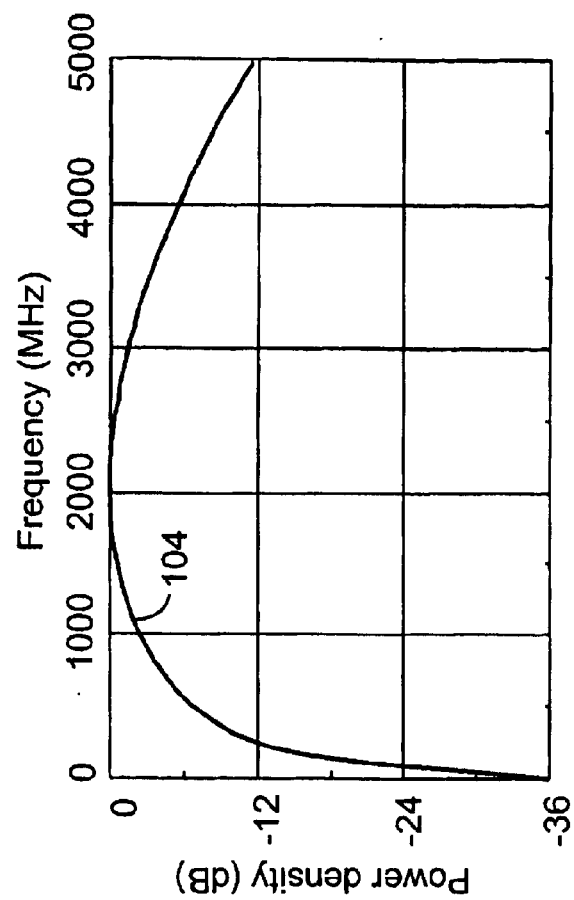
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
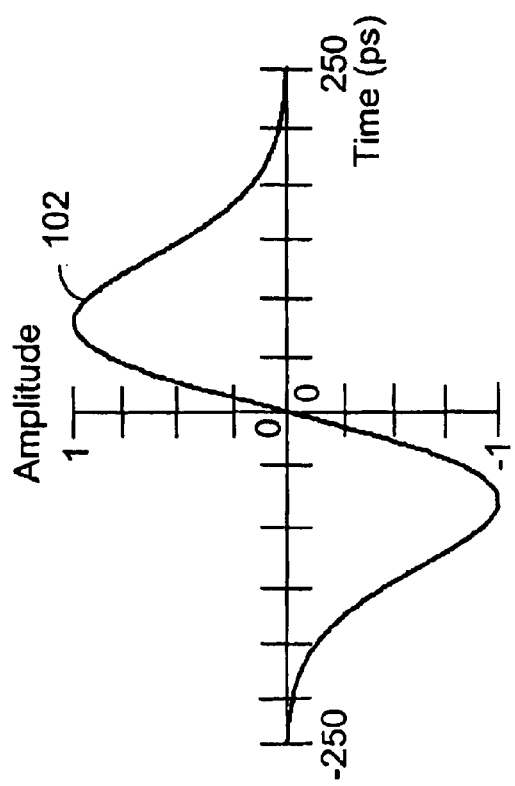
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{3/2}\sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figures 2A, 2B:
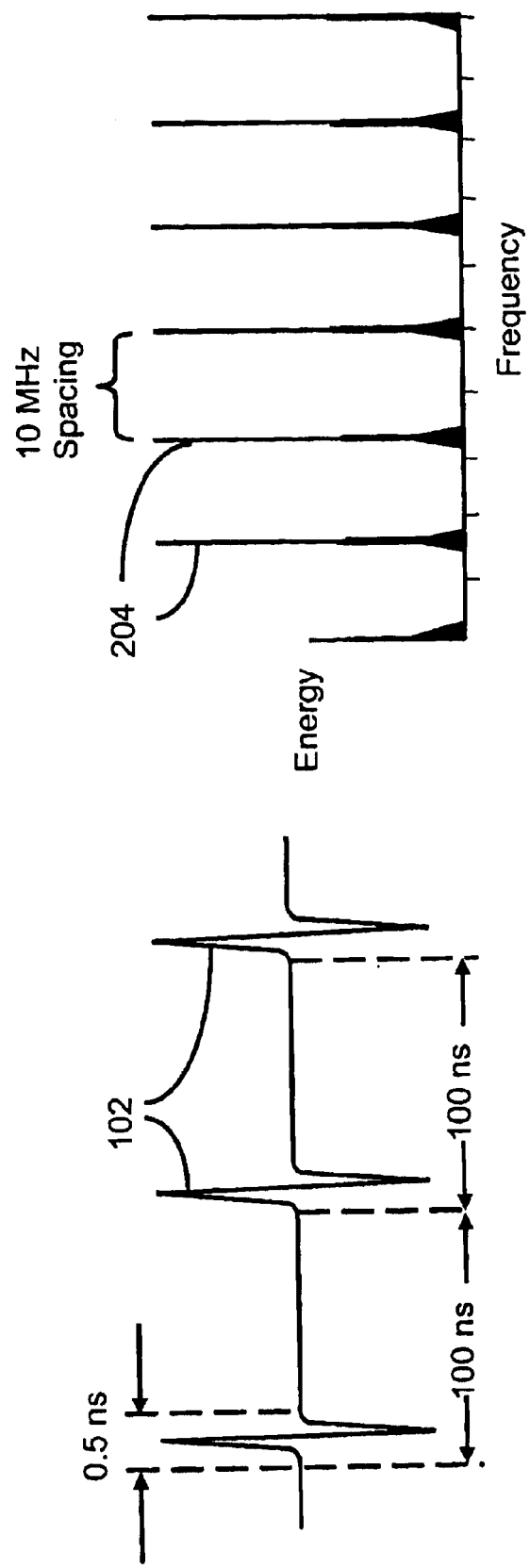
FIG. 2A illustrates a pulse train comprising pulses as in FIG. 1A.
FIG. 2B illustrates the frequency domain amplitude of the waveform of FIG. 2A.

Prototypes have been built having pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows. a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
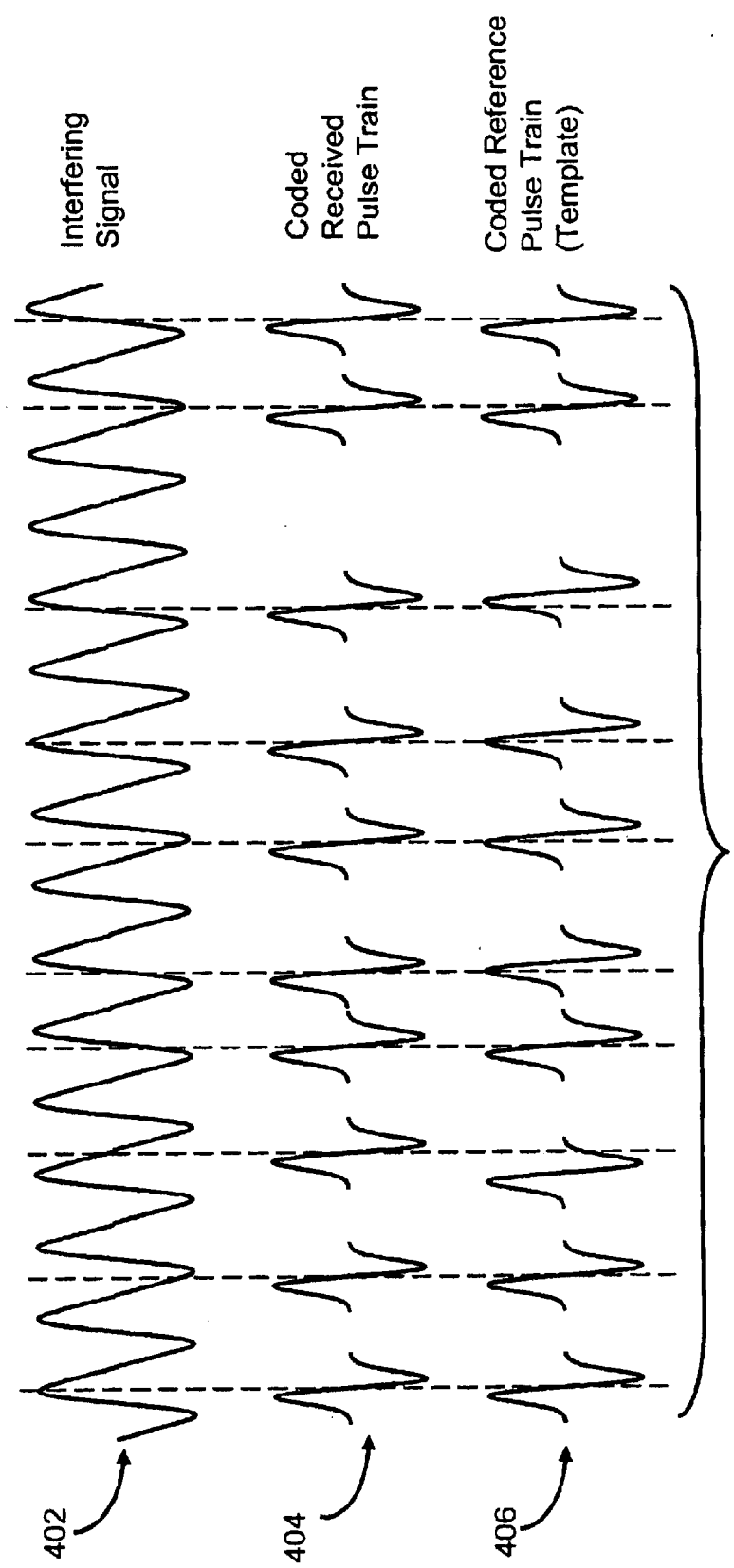
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultra wideband impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz channel bandwidth, the theoretical processing gain is 200, 000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
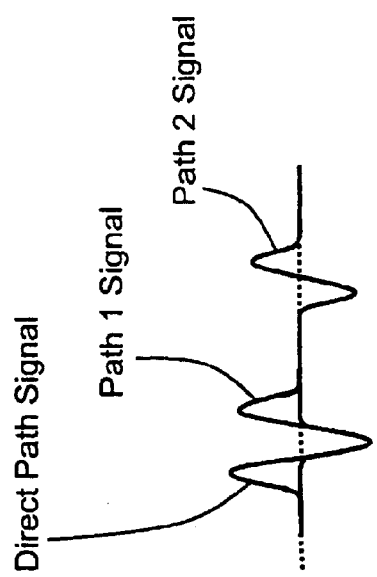
FIG. 5B illustrates exemplary multipath signals in the time domain.
Figure 5A:
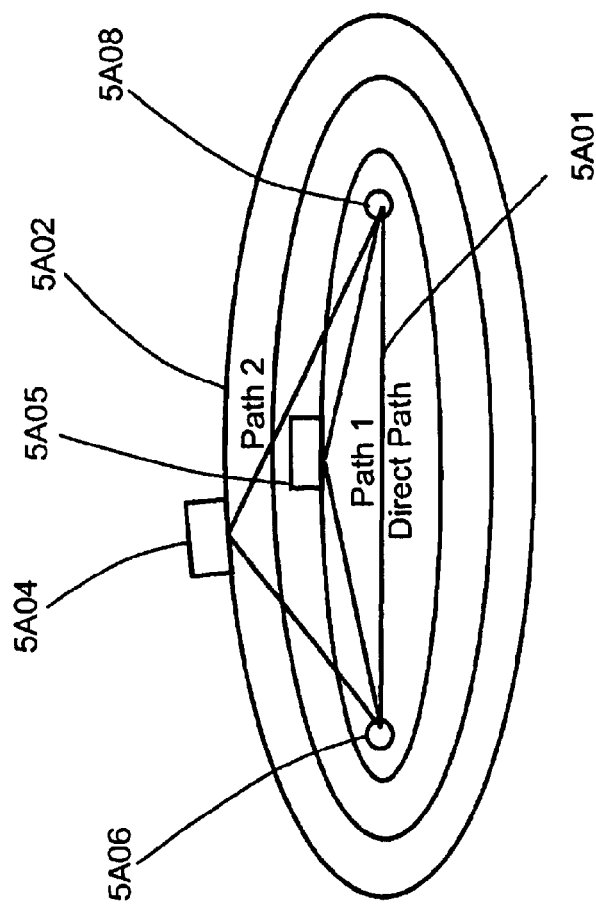
FIG. 5A illustrates a typical geometrical configuration giving rise to multipath received signals.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
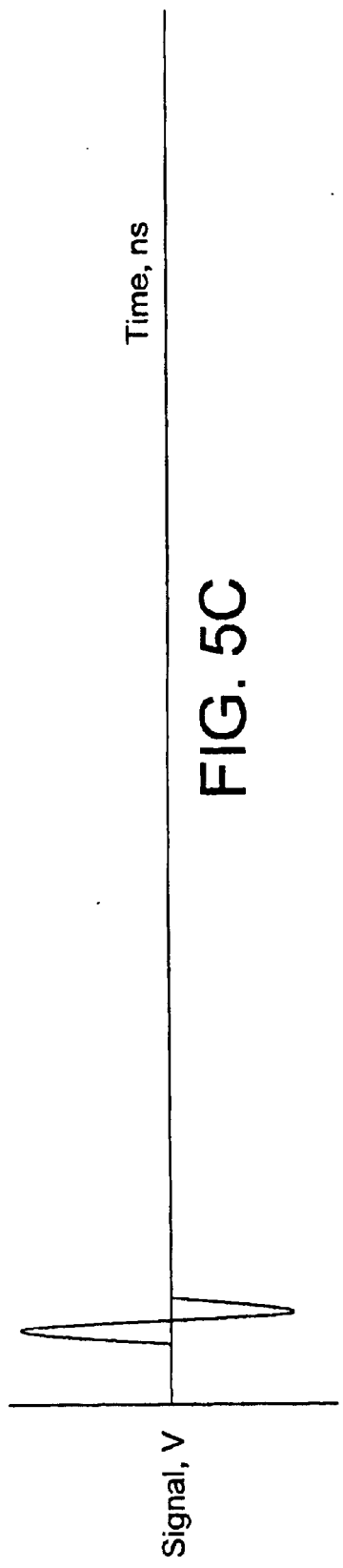
FIGS. 5C-5E illustrate a signal plot of various multipath environments.
Figure 5D:
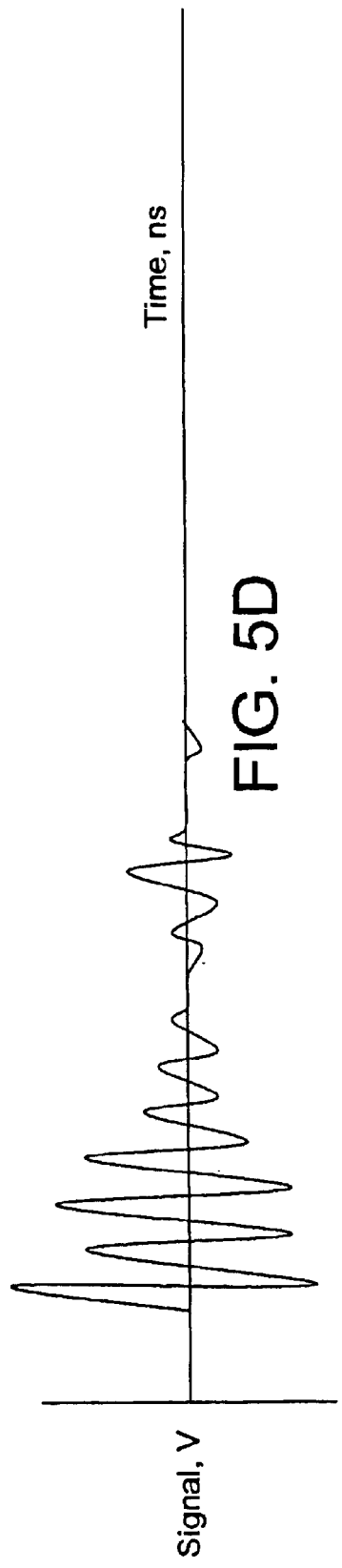
Figure 5E:
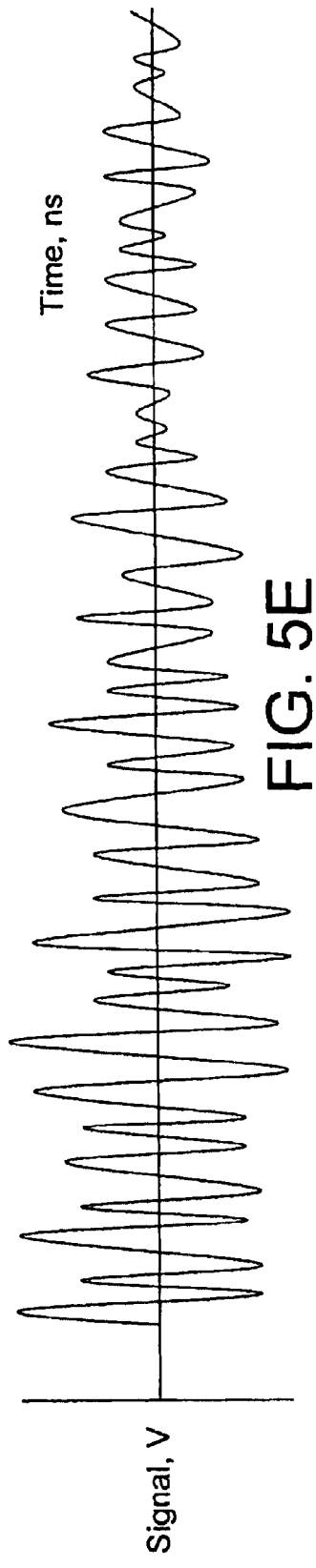

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where
  r is the envelope amplitude of the combined multipath signals, and
  $2\sigma^2$ is the RMS power of the combined multipath signals.

Figure 5F:
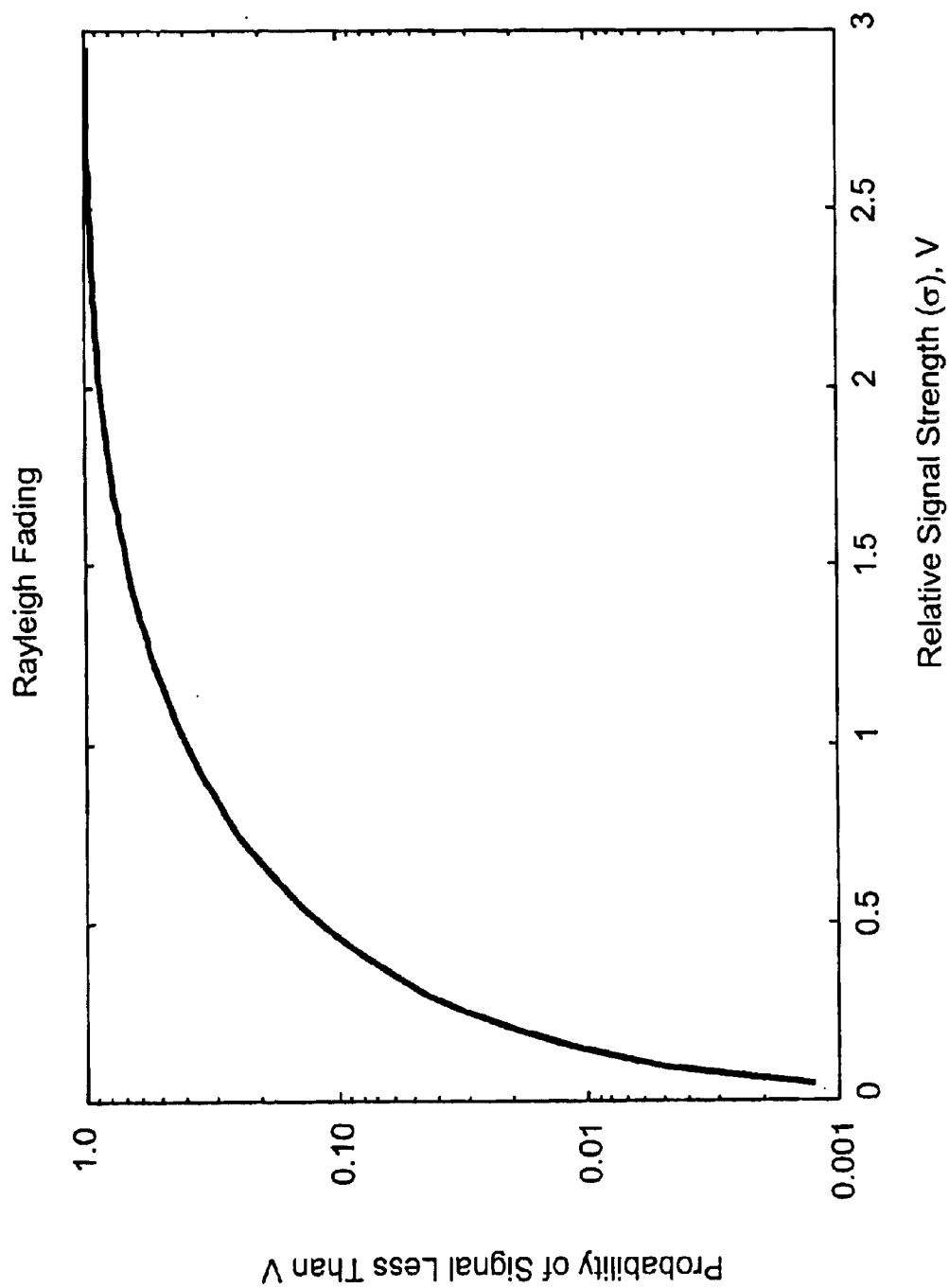
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
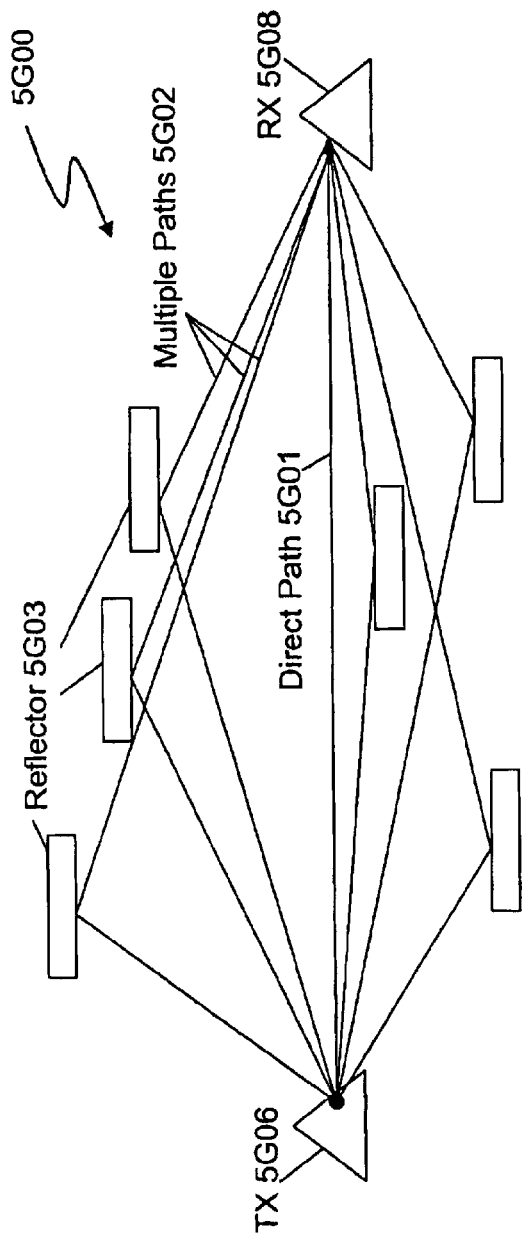
FIG. 5G illustrates a plurality of multipaths with a plurality of reflectors from a transmitter to a receiver.
Figure 5H:
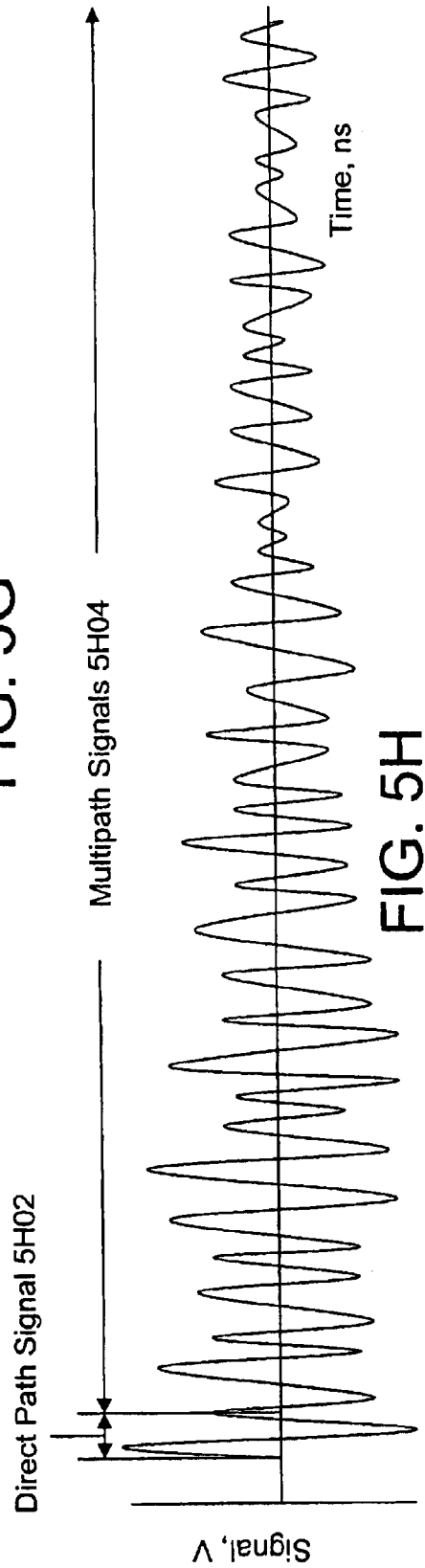
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5006 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. Systems have been built that have shown the potential for centimeter distance resolution, which is equivalent to about 30 ps of time transfer resolution. See, for example, commonly owned, co-pending U.S. patent applications Ser. No. 09/045,929, filed Mar. 23, 1998, titled "Ultrawide-Band Position Determination System and Method", and U.S. patent application Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (Ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultra wideband, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
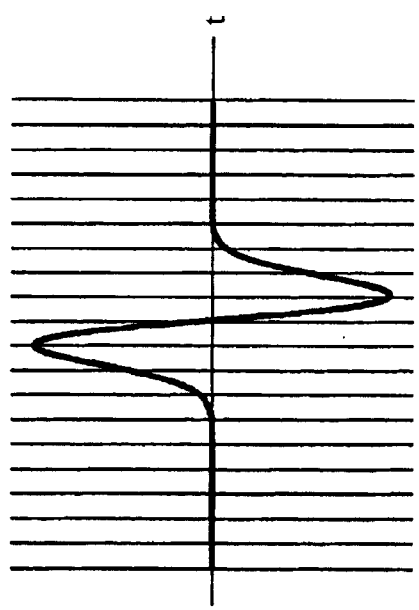
FIG. 8A illustrates a representative received pulse signal at the input to the correlator.
Figure 8B:
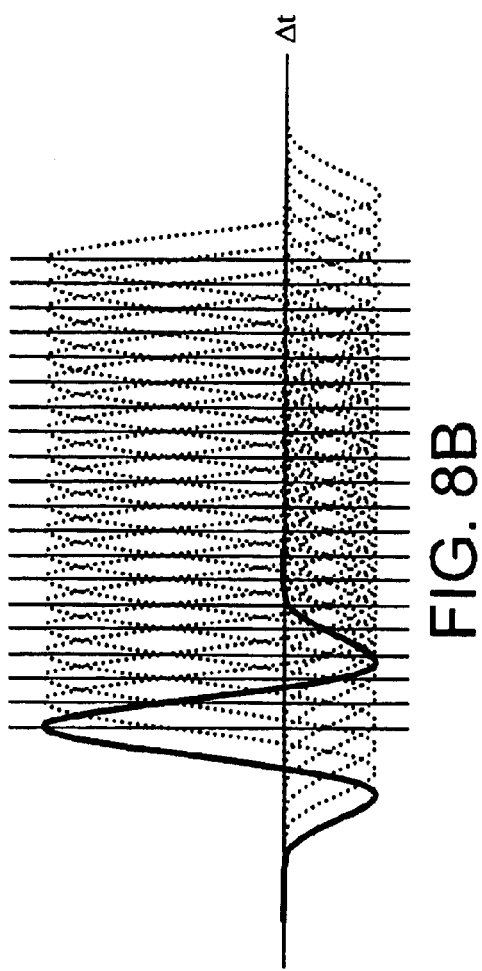
FIG. 8B illustrates a sequence of representative impulse signals in the correlation process.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. The present invention is particularly valuable when used in a radio network employing impulse radio; the present invention is compact and exhibits efficient omni-directional non-dispersive radio transmission and receive characteristics with reduced ringing in the presence of impulse signals.

Detailed Description of the Preferred Embodiment

A vital component for any radio communication system is the antenna system or systems employed for transmitting and receiving radio frequency (RF) signals. Generally, characteristics that relate to good transmitting quality for a particular antenna apply with equal relevance to receiving characteristics of the antenna. Characteristics that are preferably optimized for antennas employed with an impulse radio communication system are that the antennas should be a broadband antenna that is small and compact, well-matched (preferably impedance-matched with a 50 ohm load), efficient without a propensity for ringing when subjected to pulsed signals, non-dispersive in its transceiving operations, and omni-directional. From a practical standpoint, an antenna system should be easy to make with reliable quality in production volumes (as contrasted with volumes appropriate for prototype manufacture).

Spheroidal antennas—dipoles, and monopoles—have been found by the inventor to be well matched, efficient, physically small, and radiate non-dispersively and omni-directionally. A significant shortcoming of such antennas, however, is that they are relatively expensive and difficult to manufacture, especially in production level numbers.

A monopole spheroidal antenna consists of a single spheroidal radiating element, mounted on a ground plane combined with a feed structure. Any of the spheroidal dipole antennas has a monopole analog obtained by driving the upper radiating element against a ground plane. (Radiating elements may be referred to as "upper" and "lower," but this is only a naming convention and should not be considered as limiting in any way the orientation of the antenna.). Although a solid spheroid or spheroidal shell may be preferred, excellent results may also be obtained by a mesh, a sparse wire configuration, or a collection of plates embodiment of the antenna.

Figure 9:
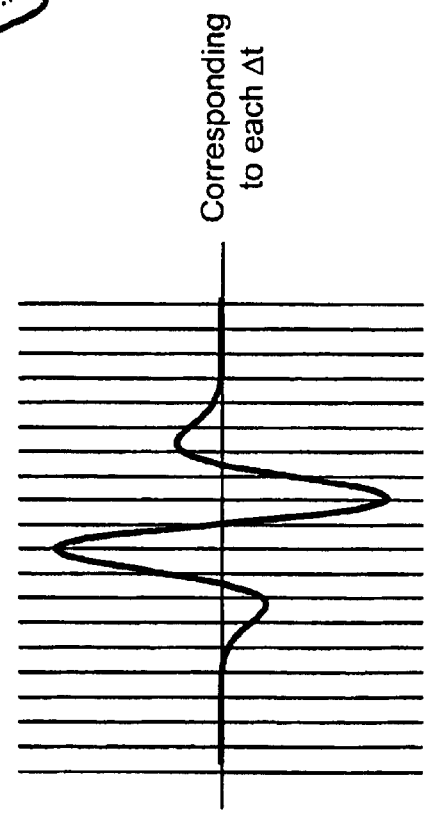
FIG. 9(A) through (D) illustrate in plan view of a variety of representative spherical monopole antennas.
Figure 9A:
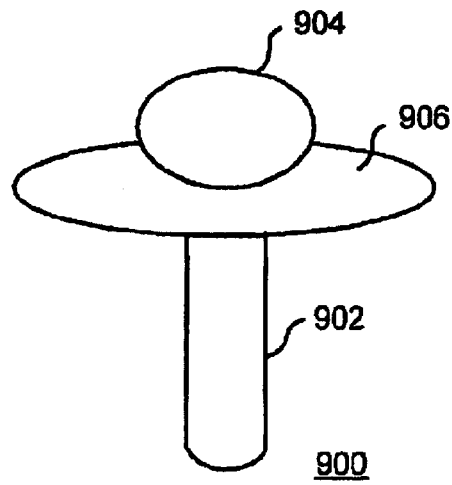

FIG. 9(A) through (D) illustrate in plan view of a variety of representative spherical monopole antennas. In FIG. 9(A), a monopole antenna 900 includes a feed structure 902 coupled with a radiating (or receiving) structure 904 and a ground plane 906. Radiating structure 904 may be in the shape of a sphere, or in a spheroidal shape. Further, radiating structure 904 may be a solid sphere or spheroid, or the desired sphere or spheroid shape may be provided by a mesh, a sparse wire configuration or a collection of plates, so long as the outer perimeter circumscribed by the radiating element or elements is the desired sphere or spheroid shape. The interior of radiating structure 904 may contain a microphone, earphone or another desired electrical, mechanical or electro-mechanical device so long as an interface through radiating structure 904 is placed appropriately to minimize interference with transmission or reception by radiating structure 904.

Figure 9B:
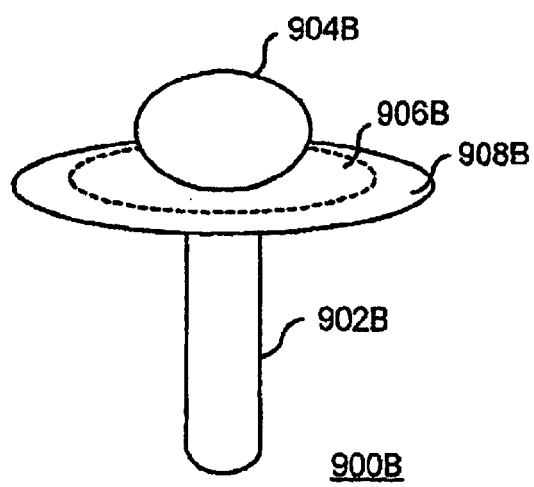
Figure 9C:
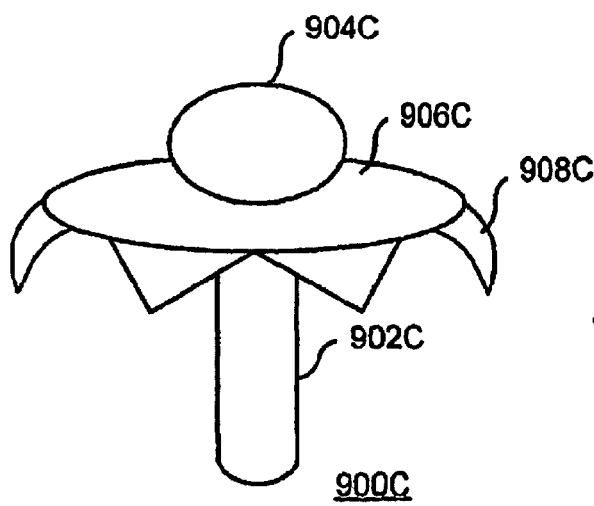
Figure 9D:
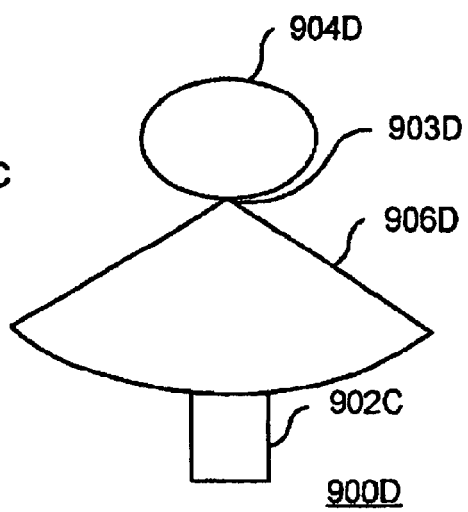

In FIG. 9(A), ground plane 906 is a substantially circular shape with radiating element 904 situated substantially centrally within ground plane 906. In some applications using particular antenna systems one may wish to alter the pattern of radiation (or the pattern of reception) or reduce signal diffraction. One structural approach to achieving such results is to treat the edge of the ground plane associated with the monopole antenna. Alternate representative embodiments are illustrated in FIGS. 9(B), 9(C), and 9(D). Thus, in FIG. 9(B), a monopole antenna 900B includes a feed structure 902B connected with a radiating element 904B and a ground plane 906B. Ground plane 906B is a substantially circular planar element with radiating element 904B substantially centrally located therein. Ground plane 906B includes a rolled edge 908B rolled away from radiating element 904B. In FIG. 9(C), a monopole antenna 900C includes a feed structure 902C connected with a radiating element 904C and a ground plane 906C. Ground plane 906C is a substantially circular shape with radiating element 904C situated substantially centrally within ground plane 906C. Ground plane 906C includes an interrupted, serrated and rolled edge 908C resulting in a "daisy" patterned rolled edge turning away from radiating element 904C. In FIG. 9(D), a monopole antenna 900D includes a feed structure 902D connected with a radiating element 904D and a ground plane 906D. A conical ground plane may be used to expand the field of view of the radiating element. Ground plane 906D is a substantially conical shape with radiating element 904D situated substantially at the apex 903D of ground plane 906D.

The various spheroidal monopole antenna structures illustrate representative monopole antenna structures that may be employed in an impulse radio system. Combinations of the structures illustrated in FIG. 9(A)-(D), or combinations employing different structures may be selected by an antenna system designer for particular antenna characteristics, such as varying diffraction patterns, varying radiating patterns or other reasons known to a skilled antenna designer. Preferably, ground plane 900, 900A, 900B, 900C, 900D should have a radius at least approximately equal to the height of the spheroid, or larger. By way of further example, a monopole radiating element 904, 904B, 904C, 904D may be mounted to an area on the exterior of a vehicle or to an equipment chassis or housing if the area forms a suitable conducting ground plane of sufficient size.

Figure 10:
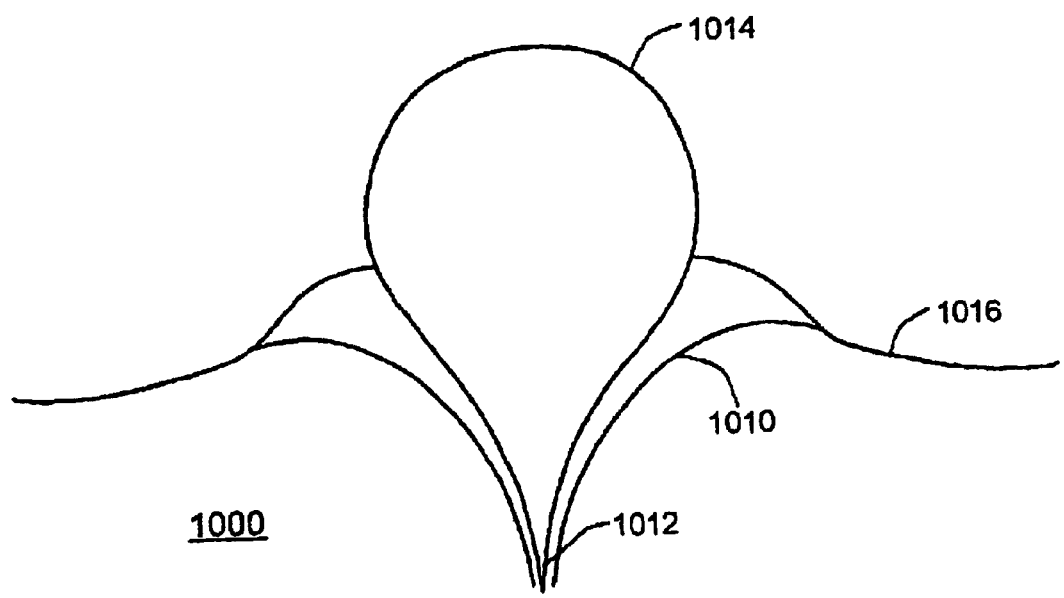
FIG. 10 is an illustration of another embodiment of a three-dimensional monopole antenna.

FIG. 10 is an illustration of another embodiment of a three-dimensional monopole antenna. In FIG. 10, a "volcano smoke" antenna 1000, as described by Kraus (John D. Kraus, *Antennas*, $2^{nd}$ edition; New York: McGraw Hill, 1988) includes a tapered feed structure 1012 joined with a spheroidal radiating element 1014 in a smooth transition region 1010. A backplane 1016 is smoothly undulating to effect radiating (and receiving) patterns as desired. "Volcano smoke" antenna 1000 may exhibit acceptable broadband characteristics for impulse radio applications; use of such antennas in impulse radio applications is not known to have occurred. Tapered feed structure 1012 provides good matching, and radiating element 1014 radiates omni-directionally. However, transition region 1010 requires a bulky configuration for "volcano smoke"antenna 1000 that resists fabrication in a compact configuration. Further, the smooth transition required of transition region 1010 makes manufacture of "volcano smoke" antenna 1000 difficult.

A dipole spheroidal antenna consists of two spheroidal radiating elements arranged along an axis. Typically, but not necessarily, the feed structure is arranged along the axis of the spheroidal dipole. The feed structure connects a radio frequency (RF) transmission line to the gap between the spheroidal radiating elements. The RF transmission line is usually a coaxial transmission line or connector, but may be any of a variety of different feed structures, including stripline or twin lead structures. Advantages similar to the advantages enjoyed by a solid structure may be obtained in large part using a mesh, wire frame or a plate or fin type element that occupies a spheroidal volume. Even a relatively sparse mesh, wire frame or grid provides substantially full measure of the benefits realized using a solid structure. In practicality, such a mesh, wire frame or grid structure may be preferred for advantages offered over a solid structure in terms of manufacturability, economies of material and weight, lesser wind loading, or improved aesthetic considerations.

FIG. 11(A) through (E) illustrate representative embodiments of spheroidal dipole antenna structures. The illustrations of FIG.11 (A) through (E) are intended to indicate the respective antenna structures as solid configurations, as wire mesh configurations circumscribing a desired shape or to indicate the desired shape that is circumscribed by a multiple fin or grid structure.

In FIG. 11(A), a spherical dipole antenna 1100A includes a feed structure 1102A, a first spherical radiating (or receiving) element 1104A and a second spherical radiating (or receiving) element 1106A. Spherical radiating elements 1104A, 1106A are oriented substantially symmetrically about an axis 1108A. Axis 1108A is typically coaxial with feed structure 1102A, but such an axial coincidence is not required. Feed structure 1102A is connected (not visible in FIG. 11(A)) with spherical radiating elements 1104A, 1106A appropriately to establish a radio frequency antenna structure.

In FIG. 11(B), a prolate spheroidal dipole antenna 1100B includes a feed structure 1102B, a first spheroidal radiating (or receiving) element 1104B and a second spheroidal radiating (or receiving) element 1106B. Spheroidal radiating elements 1104B, 1106B each have a major axis and a minor axis and are each oriented with their respective major axis substantially coincident with an axis 1108B. Axis 1108B is typically coaxial with feed structure 1102B, but such an axial coincidence is not required. Feed structure 1102B is connected (not visible in FIG. 11(B)) with spheroidal radiating elements 1104B, 1106B appropriately to establish a radio frequency antenna structure.

In FIG. 11(C), an oblate spheroidal dipole antenna 1100C includes a feed structure 1102C, a first spheroidal radiating (or receiving) element 1104C and a second spheroidal radiating (or receiving) element 1106C. Spheroidal radiating elements 1104C, 1106C each have a major axis and a minor axis and are each oriented with their respective minor axis substantially coincident with an axis 1108C. Axis 1108C is typically coaxial with feed structure 1102C, but such an axial coincidence is not required. Feed structure 1102C is connected (not visible in FIG. 11(C)) with spheroidal radiating elements 1104C, 1106C appropriately to establish a radio frequency antenna structure.

In FIG. 11(D), a Blefuscuan spheroidal dipole antenna 1100D includes a feed structure 1102D, a first spheroidal radiating (or receiving) element 1104D and a second spheroidal radiating (or receiving) element 1106D. (An ovoid excited from the smaller end is referred to as a "Lilliputian ovoid" after the miniature people described in Gulliver's Travels who ate their eggs from the small end. An ovoid excited from the fatter end is referred to as a "Blefuscuan ovoid" after the hereditary rivals of the Lilliputians who ate their eggs from the fat end.) Radiating elements 1104D, 1106D are each egg-shaped with a major axis, and are each oriented with their respective major axis substantially coincident with an axis 1108D. Axis 1108D is typically coaxial with feed structure 1102D, but such an axial coincidence is not required. Feed structure 1102D is connected (not visible in FIG. 11(D)) with spheroidal radiating elements 1104D, 1106D appropriately to establish a radio frequency antenna structure.

In FIG. 11(E), a Lilliputian spheroidal dipole antenna 1100E includes a feed structure 1102E, a first spheroidal radiating (or receiving) element 1104E and a second spheroidal radiating (or receiving) element 1106E. Radiating elements 1104E, 1106E are each egg-shaped with a major axis, and are each oriented with their respective major axis substantially coincident with an axis 1108E. Axis 1108E is typically coaxial with feed structure 1102E, but such an axial coincidence is not required. Feed structure 1102E is connected (not visible in FIG. 11(E)) with spheroidal radiating elements 1104E, 1106E appropriately to establish a radio frequency antenna structure.

FIG. 12 illustrates the relative sizes for a biconical dipole antenna (A) vis-à-vis a spheroidal dipole (B) in terms of lowest wavelength to be handled by the antenna. In FIG. 12(A), a biconical dipole antenna 1200A with an included angle of 120° will have a 100Ω input with a voltage standing wave ratio (VSWR) of <2:1, over a 6:1 bandwidth. The geometry of biconical dipole antenna 1200A requires a minimum diameter equal to the wavelength of the lower frequency limit $\lambda_L$ of biconical dipole antenna 1200A. Accordingly, biconical dipole antenna 1200A would have a height of $0.577\lambda_L$. Antennas as large as this are prone to dispersive operation; that is, they radiate (or receive) different frequencies from different regions of the antenna. Such a large antenna would not be amenable for use with a small hand held portable device.

At the lower frequency wavelength limit $\lambda_L$ of spheroidal dipole antenna 1200B, diameter of radiating elements needs only to be in the range of approximately $$\frac{\lambda}{6} \text{ to } \frac{\lambda}{10}.$$

This is noteworthy because it is usually expected that radiating elements have a minimum size on the order of $$\frac{\lambda}{4}$$

for efficient radiation (and reception). This small diametral requirement allows spheroidal dipole antenna 1200B to have a height of approximately $0.33\lambda_L$ Such small size helps spheroidal dipole antenna 1200B radiate non-dispersively; such non-dispersive operation is well suited for impulse radio transmissions without ringing.

In contrast to biconical dipole antenna 1200A, spheroidal dipole antenna 1200B can easily achieve a sufficiently favorable VSWR to yield an efficiency of 90–96% over a large bandwidth. Such excellent efficiency over a large bandwidth indicates that reflections (and, hence, ringing) are reduced in spheroidal dipole antenna 1200B, even without resistive loading. Moreover, spheroidal dipole antenna 1200B is easily matched to 50Ω.

Figures 13A, 13B:
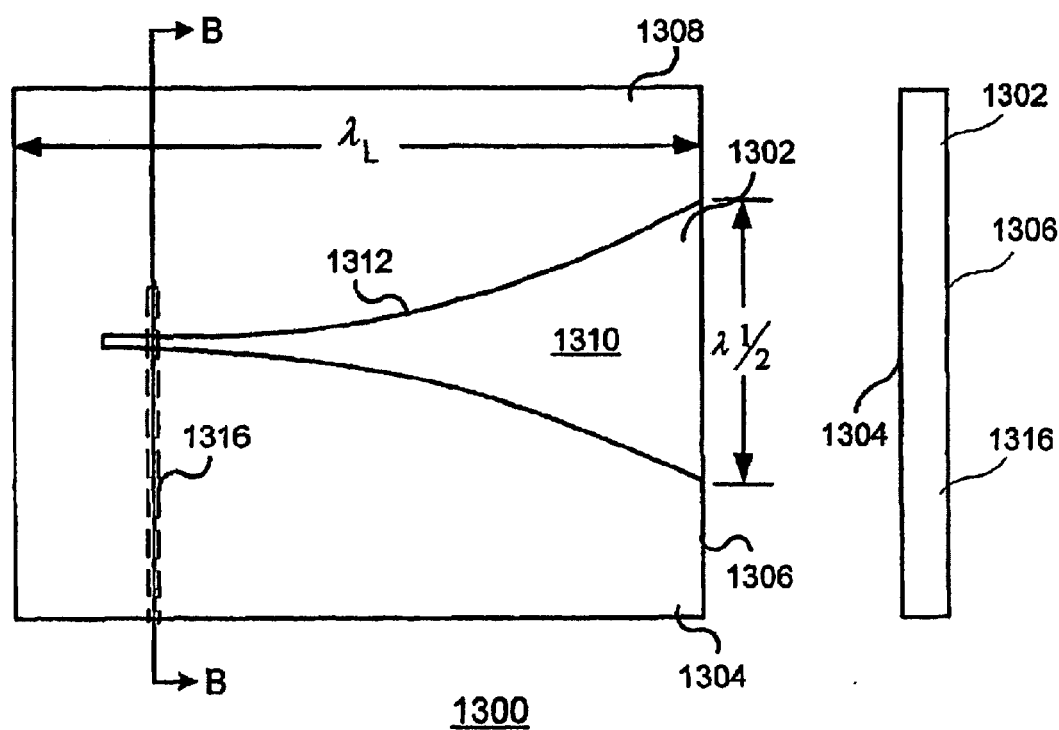
FIG. 13(A) illustrates a planar Vivaldi Slot exponential notch antenna in top plan view.
FIG. 13(B) is a side view of the antenna illustrated in FIG. 13(A), taken along Section B—B in FIG. 13(A).

FIG. 13(A) illustrates a planar Vivaldi Slot exponential notch antenna in top plan view. FIG. 13(B) is a side view of the antenna illustrated in FIG. 13(A), taken along Section B—B in FIG. 13(A). In FIG. 13(A), an exponential notch antenna 1300 includes a dielectric substrate 1302 having a top side 1304 and a bottom side 1306. A conductive material 1308 is arrayed on top side 1304 leaving an uncovered zone 1310 free of conductive material 1308. A margin 1312 is established between uncovered zone 1310 and conductive material 1308 on top side 1304 of dielectric substrate 1302. Margin 1312 traces an exponential curve; the particular shape of the exponential curve traced by margin 1312 determines operational characteristics of antenna 1300. A strip of conductive material 1316 is arrayed upon bottom side 1306 of dielectric substrate 1302. The placement and dimensions of strip of conductive material 1316 effects impedance matching of antenna 1300 with an associated feed structure (not shown in FIG. 13). Exponential notch antenna 1300 is an example of a planar antenna used in broadband radio applications. Such exponential notch antennas as antenna 1300 can be well matched to 50Ω, a desirable condition for radio applications, but such antennas are on the order of a wavelength long (i.e., the lower limit wavelength $\lambda_L$), as indicated by dimension $\lambda_L$ in FIG. 13(A). Antennas such as exponential notch antenna 1300 are easily and dependably manufactured, but they are very large and are directive in their operation; they are not omni-directional.

A spheroidal dipole is a special case of what has been called a "causal surface antenna". See "The Energy Flow and Frequency Spectrum About Electric and Magnetic Dipoles" by Hans Gregory Schantz; Ph.D. Dissertation, University of Texas; August 1995. Planar ovoidal antennas have been found to have similar causal surface effects to those of spheroidal antennas. A causal surface is one through which there is no flow of electromagnetic energy. A "causal surface antenna" describes an antenna designed to have minimal stored or reactive energy. Such an antenna has a very low quality factor or "Q," and thus a very broad bandwidth response. Because there is minimal reactive energy, a causal surface antenna presents a largely resistive match over the same broad band of frequencies.

Since the dimensions of a causal surface tend to be on the order of $\lambda/2\pi=0.159\lambda$, a causal surface antenna can be made significantly smaller than the typical $\lambda/4=0.250\lambda$ dimension usually thought necessary to have an efficiently radiating antenna. This small size makes it easier to fit a causal surface antenna into a smaller volume efficient package, and also tends reduce ringing or dispersive behavior by the antenna.

When a static, electric Hertzian dipole antenna undergoes certain classes of exponential and damped exponential decays, there exists about the dipole a spherical "causal surface," through which there is no flux of electromagnetic energy. This result suggests that a spherical antenna will have particularly good properties. The inventor has discovered that spheroidal and ovoidal antennas are well suited for employment with impulse radio systems for several technical and economic reasons.

Figure 14:
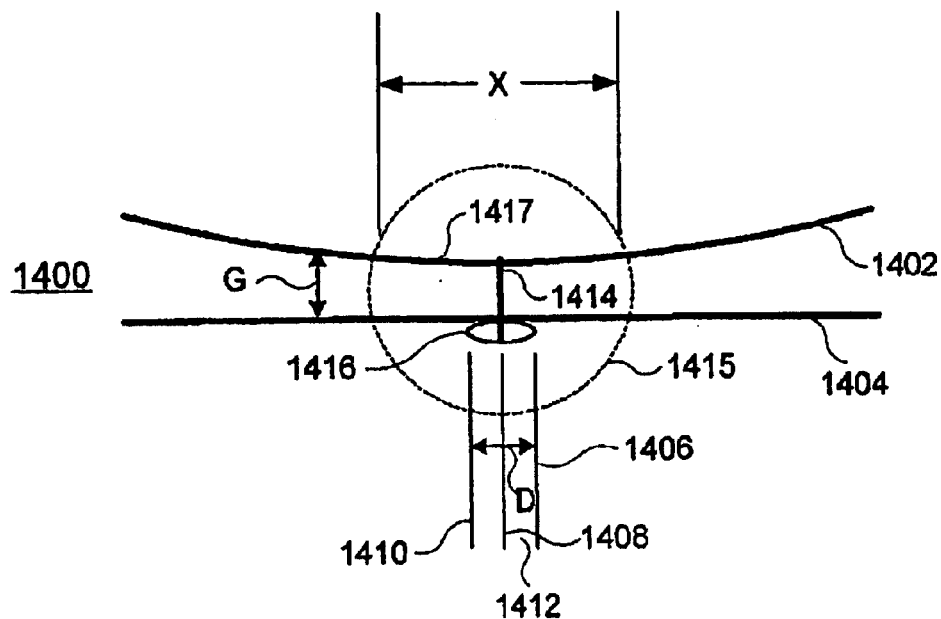
FIG. 14 is a schematic diagram of detail of an antenna feed structure for a spheroidal monopole antenna.

FIG. 14 is a schematic diagram of detail of an antenna feed structure for a spheroidal monopole antenna. In FIG. 14, a spheroidal monopole antenna 1400 includes a spheroidal radiating element 1402, a generally planar backplane structure 1404 and a feed structure 1406. Feed structure 1406 is illustrated as a coaxial feed structure including a feed line 1408 substantially surrounded by a sleeve 1410. A space 1412 between feed line 1408 and sleeve 1410 may be occupied by air or by a dielectric material. Illustrating feed structure 1406 as a coaxial feed structure is merely illustrative and is not intended to limit the variety of transmission lines or connectors that could be employed in constructing feed structure 1406. A feed structure that is oriented substantially about the axis of an antenna is generally preferred because energy flow and surface currents are minimized at the axial locus.

Feed structure 1406 is coupled with antenna 1400 in a feed region 1415. Feed line 1408 is connected with radiating element 1402 at a feed point 1414 within feed region 1415, and sleeve 1410 is connected with back plane 1404 at a low potential connection locus 1416 within feed region 1415. Low potential connection locus 1416 is preferably a ground connection. If additional mechanical strength or improved resistance to electrical breakdown is desired, dielectric material may be included in feed region 1415.

Variation in overall spheroidal geometry of antenna 1400 may be accommodated without significantly affecting the performance of antenna 1400. The inventor has learned that feed region 1415 is critical to provide good matching and minimal reflection while operating antenna 1400. Prior art teaching has asserted that a region at which an antenna is connected with its feed should be point-like at a feed point and flare out from that feed point. The present invention incorporates an antenna feed region having a "blunt" or curved surface at a feed point, such as curved surface 1417 spanning a dimension "X" within feed region 1415. The inventor has discovered that it is advantageous to provide an approximately spheroidal surface for connecting feed structure 1406. Such a curved surface 1417 at an antenna feed point 1414 significantly lowers the impedance of the juncture between feed structure 1406 and radiating element 1402 at feed point 1414, thereby providing an improved match to 50Ω that is not so easily attainable using prior art antenna feed arrangements (if such a preferred low impedance is attainable at all).

A gap width "G" between radiating element 1402 and backplane 1404 is established by the arrangement illustrated in FIG. 14. Gap width G is a critical parameter that must be carefully arranged for providing best results using antenna 1400. A gap width G approximately equal to diameter D of feed structure 1406 is a preferred starting dimension for beginning adjustments to optimize performance.

In exemplary antenna 1400, feed structure 1406 embodies an energy guiding means radiating element 1402 cooperates with backplane structure 1404 to embody an energy channeling structure and feed region 1415 embodies a transition means.

Figure 15:
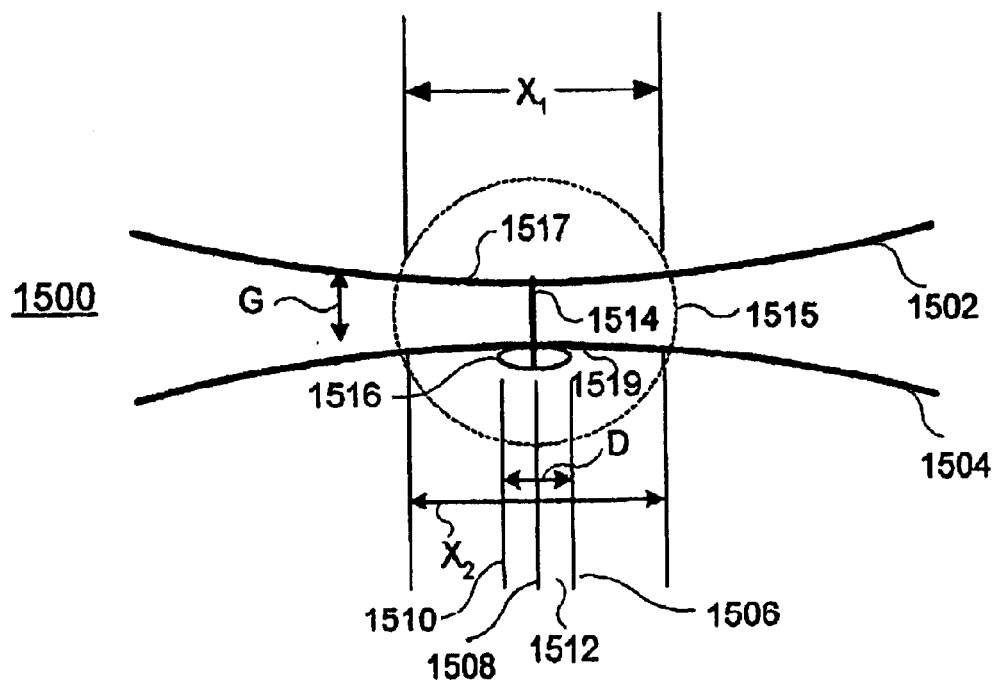
FIG. 15 is a schematic diagram of detail of an antenna feed structure for a spheroidal dipole antenna.

FIG. 15 is a schematic diagram of detail of an antenna feed structure for a spheroidal dipole antenna. In FIG. 15, a spheroidal monopole antenna 1500 includes a first spheroidal radiating element 1502, a second spheroidal radiating element 1504 and a feed structure 1506. Feed structure 1506 is illustrated as a coaxial feed structure including a feed line 1508 substantially surrounded by a sleeve 1510. A space 1512 between feed line 1508 and sleeve 1510 may be occupied by air or by a dielectric material. Illustrating feed structure 1506 as a coaxial feed structure is merely illustrative and is not intended to limit the variety of transmission lines or connectors that could be employed in constructing feed structure 1506. A feed structure that is oriented substantially about the axis of an antenna is generally preferred because energy flow and surface currents are minimized at the axial locus.

Feed structure 1506 is coupled with antenna 1500 in a feed region 1515. Feed line 1508 is connected with first radiating element 1502 at a feed point 1514 within feed region 1515, and sleeve 1510 is connected with second radiating element 1504 at a low potential connection locus 1516 within feed region 1515. Low potential connection locus 1516 is preferably a ground connection. If additional mechanical strength or improved resistance to electrical breakdown is desired, dielectric material may be included in feed region 1515.

Variation in overall spheroidal geometry of radiating elements 1502, 1504 of antenna 1500 may be accommodated without significantly affecting the performance of antenna 1500. The inventor has learned that feed region 1515 is critical to provide good matching and minimal reflection while operating antenna 1500. Prior art teaching has asserted that a region at which an antenna is connected with its feed should be point-like at a feed point and flare out from that feed point. The present invention incorporates an antenna feed region having a "blunt" or curved surface at a feed point, such as curved surface 1517 spanning a dimension "$X_1$" about feed point 1514, and curved surface 1519 spanning a dimension "$X_2$" about feed locus 1516 within feed region 1515. The inventor has learned that it is advantageous to provide an approximately spheroidal surface for connecting feed structure 1506. Such curved surfaces 1517, 1519 at an antenna feed point 1514 or an antenna feed locus 1516 significantly lower the impedance of the juncture between feed structure 1506 and radiating elements 1502, 1504 within feed region 1515, thereby providing an improved match to 50Ω that is not so easily attainable using prior art antenna feed arrangements (if such a preferred low impedance is attainable at all).

A gap width "G" between radiating elements 1502, 1504 is established by the arrangement illustrated in FIG. 15. Gap width G is a critical parameter that must be carefully arranged for providing best results using antenna 1500. A gap width G approximately equal to diameter D of feed structure 1506 is a preferred starting dimension for beginning adjustments to optimize performance.

In exemplary antenna 1500, feed structure 1506 embodies an energy guiding means, radiating elements 1502, 1504 cooperate to embody an energy channeling structure and feed region 1515 embodies a transition means.

To facilitate miniaturization, a spheroidal antenna may be coated or even encased in dielectric to have the effect of miniaturizing still further the dimensions of the antenna. The dielectric constant may be varied from the gap to the outer surface to improve matching.

Figures 16A, 16B:
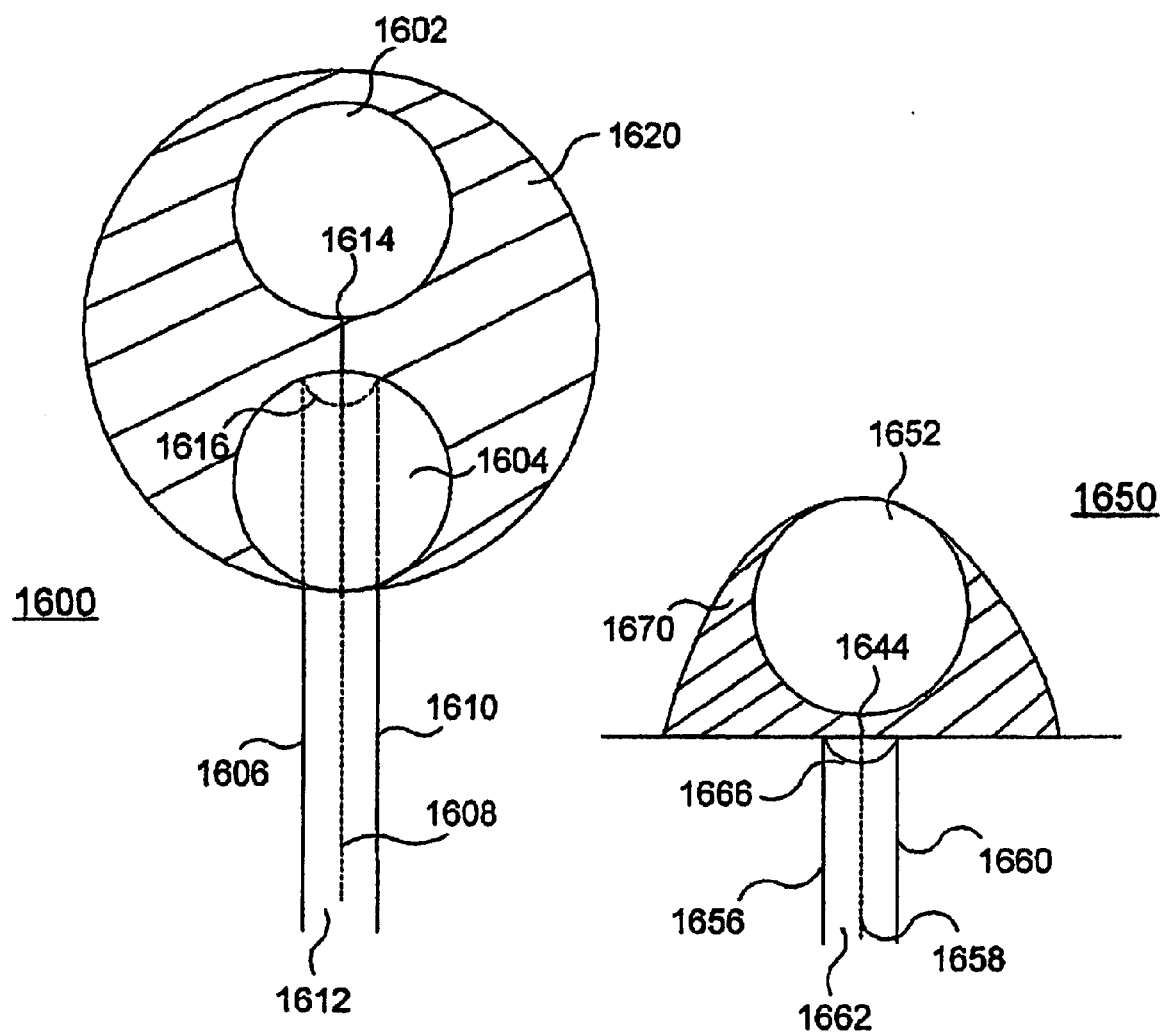
FIG. 16(A) is a schematic section view of a spheroidal dipole antenna included within a dielectric structure.
FIG. 16(B) is a schematic section view of a spheroidal monopole antenna included within a dielectric structure.

FIG. 16(A) is a schematic section view of a spheroidal dipole antenna included within a dielectric structure. In FIG. 16(A), s spheroidal dipole antenna 1600 includes a first spheroidal radiating element 1602, a second spheroidal radiating element 1604 and a feed structure 1606. Feed structure 1606 is illustrated as a coaxial feed structure including a feed line 1608 substantially surrounded by a sleeve 1610. A space 1612 between feed line 1608 and sleeve 1610 may be occupied by air or by a dielectric material. Illustrating feed structure 1606 as a coaxial feed structure is merely illustrative and is not intended to limit the variety of transmission lines or connectors that could be employed in constructing feed structure 1606. A feed structure that is oriented substantially about the axis of an antenna is generally preferred because energy flow and surface currents are minimized at the axial locus.

Feed line 1608 is connected with first radiating element 1602 at a feed point 1614, and sleeve 1610 is connected with second radiating element 1604 at a low potential connection locus 1616. Low potential connection locus 1616 is preferably a ground connection. In order to provide additional mechanical strength or improved resistance to electrical breakdown, a dielectric wrap 1620 is installed substantially surrounding radiating elements 1602, 1604. Preferably, dielectric wrap 1620 is a substantially solid spheroidal structure in its surrounding relationship with radiating elements 1602, 1604.

FIG. 16(B) is a schematic section view of a spheroidal monopole antenna included within a dielectric structure. In FIG. 16(B), a spheroidal monopole antenna 1650 includes a spheroidal radiating element 1652, a back plane 1654 and a feed structure 1656. Feed structure 1656 is illustrated as a coaxial feed structure including a feed line 1658 substantially surrounded by a sleeve 1660. A space 1662 between feed line 1658 and sleeve 1660 may be occupied by air or by a dielectric material. Illustrating feed structure 1656 as a coaxial feed structure is merely illustrative and is not intended to limit the variety of transmission lines or connectors that could be employed in constructing feed structure 1656. A feed structure that is oriented substantially about the axis of an antenna is generally preferred because energy flow and surface currents are minimized at the axial locus.

Feed line 1658 is connected with radiating element 1652 at a feed point 1664, and sleeve 1660 is connected with back plane 1654 at a low potential connection locus 1666. Low potential connection locus 1666 is preferably a ground connection. In order to provide additional mechanical strength or improved resistance to electrical breakdown, a dielectric wrap 1670 is installed substantially surrounding radiating element 1652. Preferably, dielectric wrap 1670 is a substantially solid hemispheroidal structure in its surrounding relationship with radiating element 1652.

Keeping in mind the characteristics that are preferably optimized for an antenna employed with an impulse radio communication system (i.e., the antenna should be a broadband antenna that is small and compact, well-matched—preferably impedance-matched with a 50 ohm load, efficient without a propensity for ringing when subjected to pulsed signals, non-dispersive in its transceiving operations, and omni-directional) one must consider the ease of manufacture in reliable quantities provided by a planar antenna.

Ovoidal antennas—dipoles, and monopoles—have been found by the inventor to be well matched, efficient, physically small, and radiate non-dispersively and omni-directionally. A significant advantage of such antennas is that they are relatively inexpensive and easy to reliably manufacture in production level numbers.

A monopole ovoidal antenna consists of a single planar ovoidal radiating element, mounted on a ground plane combined with a feed structure. Any of the ovoidal dipole antennas has a monopole analog obtained by driving the ovoidal radiating element against a ground plane. Although a solid ovoid may be preferred, excellent results may also be obtained by a mesh or a sparse wire configuration embodiment of the antenna.

Figure 17A:
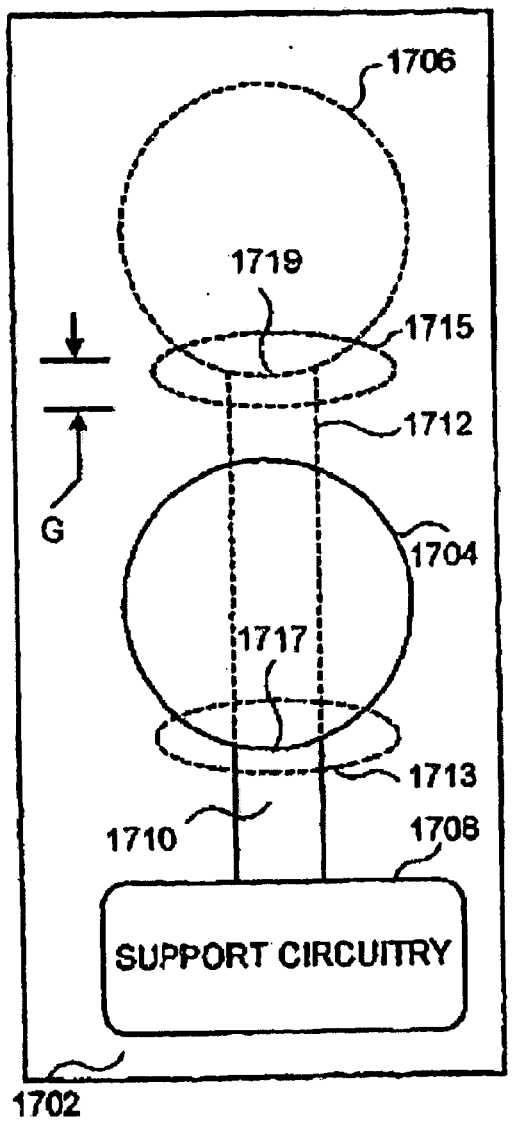
FIG. 17(A) is a top plan view of an integrated circuit employment of a planar ovoidal antenna embodied in a dipole ovoidal antenna having radiating elements arrayed on opposite sides of a substrate.

FIG. 17(A) is a top plan view of an integrated circuit employment of a planar ovoidal antenna embodied in a dipole ovoidal antenna having radiating elements arrayed on opposite sides of a substrate. In FIG. 17(A), a planar dipole ovoidal antenna 1700 includes a substantially planar substrate 1702, a first ovoidal radiating element 1704 carried upon a top side of substrate 1702, a second ovoidal radiating element 1706 carried upon a bottom side of substrate 1702 and support circuitry 1708 carried upon substrate 1702.

Support circuitry 1708 may be carried on either side of substrate 1702. Support circuitry 1708 is carried upon the top side of substrate 1702 in FIG. 17(A) for illustrative purposes.

A first circuit trace 1710 on the top side of substrate 1702 connects support circuitry 1708 with first radiating element 1704 at a connection locus 1713. At high frequencies of the sort involved with radio frequency (RF) employment of antenna 1700, and especially at the frequencies employed for ultra-wideband impulse radio applications, signals travel substantially on the surface of radiating element 1704 (i.e., at a shallow skin depth) from connection locus 1713 to a feed region 1715. Support circuitry 1708 is connected with a second circuit trace 1712 (the connection is not visible in FIG. 17(A)) and second circuit trace 1712 connects support circuitry 1708 with second radiating element 1706 on the bottom side of substrate 1702 in feed region 1715. Feed region 1715 is effectively established in a region in which radiating elements 1704, 1706 are excited against each other. In fact, radiating elements 1704, 1706 may comprise a multi-layer structure to function as a microphone, earphone or another desired electrical, mechanical or electromechanical device so long as radiating elements 1704, 1706 remain substantially thin and so long as an interface through radiating elements 1704, 1706 is placed to minimize interference with transmission or reception by radiating elements 1704, 1706.

Support circuitry 1708 may include, for example, radio frequency (RF) circuitry, a battery, switches, indicators, interface circuits, displays and other equipment or devices supporting or using antenna 1700.

Variation in overall ovoidal geometry of radiating elements 1704, 1706 of antenna 1700 may be accommodated without significantly affecting the performance of antenna 1700. The inventor has learned that feed region 1715 is critical to provide good matching and minimal reflection while operating antenna 1700. The lessons of the present invention apply with substantially equal relevance to planar antennas as they apply to three-dimensional antennas (discussed above in connection with FIGS. 14-16). Prior art teaching has asserted that a region at which an antenna is connected with its feed should be point-like at a feed point and flare out from that feed point. The present invention incorporates an antenna feed region having a "blunt" or curved surface at a feed point, such as curved junctures 1717, 1719 spanning feed region 1715. It is advantageous to provide an approximately ovoidal juncture for connecting circuit traces 1710, 1712. The inventor has discovered that such curved junctures 1717, 1719 at an antenna feed region 1715 significantly lower the impedance of the juncture between feed structure embodied in circuit traces 1710, 1712. Radiating elements 1704, 1706 within feed region 1715 thereby providing an improved match to 50Ω that is not so easily attainable using prior art antenna feed arrangements (if such a preferred low impedance is attainable at all).

A gap width "G" between radiating elements 1704, 1706 is established by the arrangement illustrated in FIG. 17(A). Gap width G is a critical parameter that must be carefully arranged for providing best results using antenna 1700. A gap width "G" approximately equal to the width W of circuit trace 1712 is a preferred starting dimension for beginning adjustments to optimize performance.

Figure 17B:
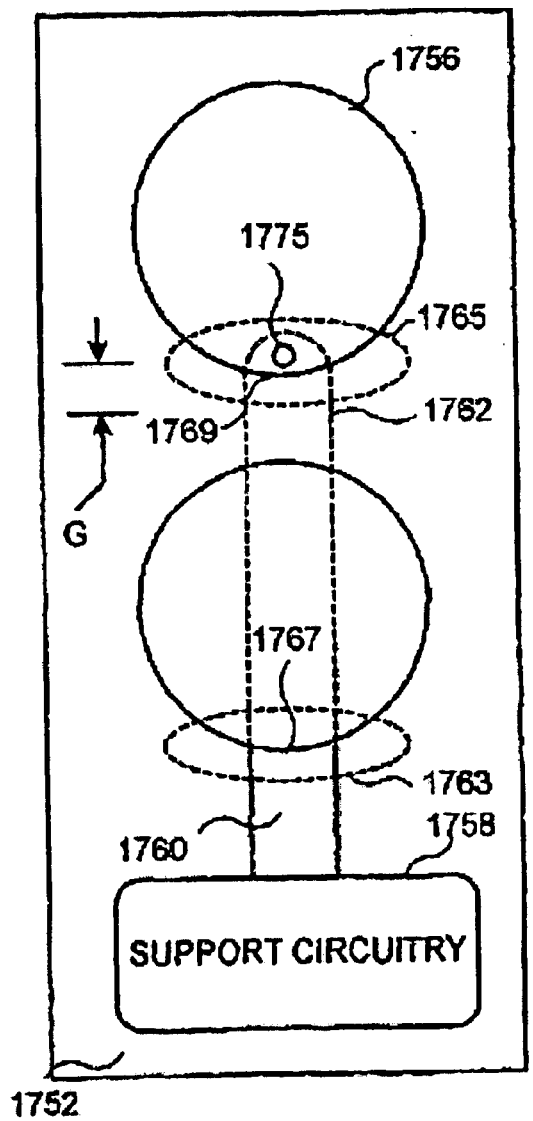
FIG. 17(B) is a top plan view of an integrated circuit employment of a planar ovoidal antenna embodied in a dipole ovoidal antenna having radiating elements arrayed on one side of a substrate.

FIG. 17(B) is a top plan view of an integrated circuit employment of a planar ovoidal antenna embodied in a dipole ovoidal antenna having radiating elements arrayed on one side of a substrate. In FIG. 17(B), a planar dipole ovoidal antenna 1750 includes a substantially planar substrate 1752, a first ovoidal radiating element 1754 carried upon a top side of substrate 1752, a second ovoidal radiating element 1756 carried upon the top side of substrate 1752 (the same side of substrate 1752 that carries first radiating element 1754) and support circuitry 1758 carried upon substrate 1752. Support circuitry 1758 may be carried on either side of substrate 1752. Support circuitry 1758 is carried upon the top side of substrate 1752 in FIG. 17(B) for illustrative purposes.

A first circuit trace 1760 on the top side of substrate 1752 connects support circuitry 1758 with first radiating element 1754 at a connection locus 1763. At high frequencies of the sort involved with radio frequency (RF) employment of antenna 1750, and especially at the frequencies employed for ultra-wideband impulse radio applications, signals travel substantially on the surface of radiating element 1754 (i.e., at a shallow skin depth) from connection locus 1763 to a feed region 1765. Support circuitry 1758 is connected with a second circuit trace 1762 on the bottom side of substrate 1752 (the connection is not visible in FIG. 17(B)) and second circuit trace 1762 connects support circuitry 1758 with second radiating element 1756 via the bottom side of substrate 1752 and a through-hole 1775 (or another via structure) in a feed region 1765.

Support circuitry 1758 may include, for example, radio frequency (RF) circuitry, a battery, switches, indicators, interface circuits, displays and other equipment or devices supporting or using antenna 1750.

Variation in overall ovoidal geometry of radiating elements 1754, 1756 of antenna 1750 may be accommodated without significantly affecting the performance of antenna 1750. The inventor has learned that feed region 1765 is critical to provide good matching and minimal reflection while operating antenna 1750. The lessons of the present invention apply with substantially equal relevance to planar antennas as they apply to three-dimensional antennas (discussed above in connection with FIGS. 14-16). Prior art teaching has asserted that a region at which an antenna is connected with its feed should be point-like at a feed point and flare out from that feed point. The present invention incorporates an antenna feed region having a "blunt" or curved surface at a feed point, such as curved junctures 1767, 1769 spanning feed region 1765. It is advantageous to provide an approximately ovoidal juncture for connecting circuit traces 1760, 1762. The inventor has discovered that such curved junctures 1767, 1769 at an antenna feed region 1765 significantly lower the impedance of the juncture between feed structure embodied in circuit traces 1760, 1762 and radiating elements 1754, 1756 within feed region 1765 thereby providing an improved match to 50Ω that is not so easily attainable using prior art antenna feed arrangements (if such a preferred low impedance is attainable at all).

A gap width "G" between radiating elements 1754, 1756 is established by the arrangement illustrated in FIG. 17(B). Gap width G is a critical parameter that must be carefully arranged for providing best results using antenna 1750. A gap width "G" approximately equal to the width W of circuit trace 1762 is a preferred starting dimension for beginning adjustments to optimize performance.

FIG. 18(A) is a side view of a right angle coaxial connector feed structure with a planar antenna. In FIG. 18(A), an antenna assembly 1800 includes a dielectric substrate 1802 carrying a first radiating element 1804 and a second radiating element 1806. A coaxial connector 1808 provides a connection structure 1810 for a coaxial cable (not shown in FIG. 18(A)), and a right-angle structure 1812. Coaxial connector 1808 is affixed with dielectric substrate 1802 incorporating spacer structure 1814. Spacer structure 1814 may, for example, include a plurality of nylon spacers, or another spacer structure appropriate to establish a gap dimension "X" from dielectric substrate 1802 appropriate for proper antenna operation by antenna assembly 1800. Ground pins 1816 (only one ground pin 1816 is visible in FIG. 18(A)) connect first radiating element 1804 with ground connectors 1818 (only one ground pin 1818 is visible in FIG. 18(A)). Center pin 1820 connects second radiating element 1806 with the center connector wire of the coaxial cable (not shown in FIG. 18(A)) attached using coaxial connector 1808.

FIG. 18(B) is a side view of a straight coaxial connector feed structure with a planar antenna. In FIG. 18(B), an antenna assembly 1850 includes a dielectric substrate 1852 carrying a first radiating element 1854 and a second radiating element 1856. A coaxial connector 1858 provides a connection structure 1860 for a coaxial cable (not shown in FIG. 18(B)). Coaxial connector 1858 is affixed with dielectric substrate 1852 incorporating spacer structure 1864. Spacer structure 1864 may, for example, include a plurality of nylon spacers, or another spacer structure appropriate to establish a gap dimension "X" from dielectric substrate 1852 appropriate for proper antenna operation by antenna assembly 1850. Ground pins 1866 (only one ground pin 1866 is visible in FIG. 18(B)) connect first radiating element 1854 with ground connectors 1868 (only one ground pin 1868 is visible in FIG. 18(B)). Center pin 1870 connects second radiating element 1856 with the center connector wire of the coaxial cable (not shown in FIG. 18(B)) attached using coaxial connector 1858.

FIG. 18(C) is a top view of a curved feed interface arrangement for an antenna of the sort illustrated in FIG. 18(A) or FIG. 18(B) taken along Section 18CD—18CD of FIG. 18(A) or FIG. (B). In FIG. 18(C), radiating elements 1804, 1806 are carried upon dielectric substrate 1802. In feed region 1815, ground pins 1816 are connected with first radiating element 1804, and center pin 1820 is connected with second radiating element 1806. Connection may be effected using solder or other known connection techniques. A gap G is established between radiating elements 1804, 1806.

FIG. 18(D) is a top view of a straight feed interface arrangement for an antenna of the sort illustrated in FIG. 18(A) or FIG. 18(B) taken along Section 18CD—18CD of FIG. 18(A) or FIG. (B). In FIG. 18(D), radiating elements 1854, 1856 are carried upon dielectric substrate 1852. In feed region 1865, ground pins 1866 are connected with first radiating element 1854, and center pin 1870 is connected with second radiating element 1856. Connection may be effected using solder or other known connection techniques. A gap G is established between radiating elements 1854, 1856.

Figure 19:
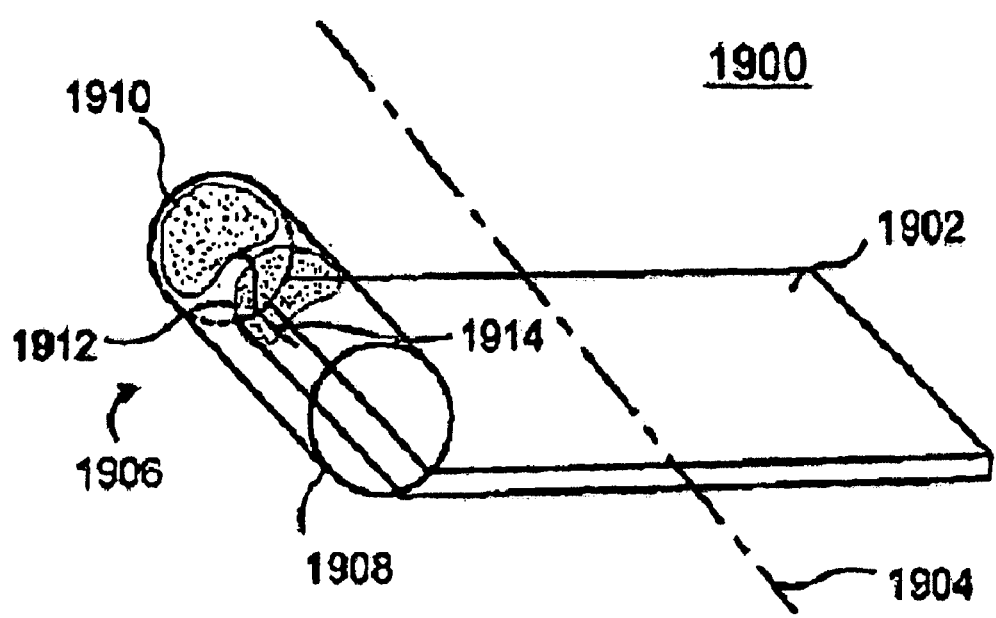
FIG. 19 is a perspective view in partial section of a PCMCIA card with an integral ultra wideband antenna.

FIG. 19 is a perspective view in partial section of a PCMCIA card with an integral ultra wideband antenna. In FIG. 19, a PCMCIA (Personal Computer Memory Card International Association) apparatus 1900 includes a card-shaped device 1902 configured for insertion into an appropriate PCMCIA card receiver slot (not shown in FIG. 19) to a full insertion locus 1904. PCMCIA apparatus 1900 includes an integral antenna 1906. An exemplary shape for antenna 1906 is illustrated in FIG. 19 in the form of a cylindrical substrate 1908 carrying a first radiating (or receiving) element 1910 and a second radiating (or receiving) element 1912. Radiating elements 1910, 1912 are fed by a feed structure 1914 (such as a transmission line). Feed structure 1914 is connected with support circuitry within card-shaped device 1902 (details not shown in FIG. 19). This configuration of antenna 1906 is particularly amenable for advantageous use with wireless communication devices connecting with personal computers (including laptop computers) via a PCMCIA structure. Card-shaped device 1902 may preferably be manufactured to ensure that its insertion to full insertion locus 1904 situates antenna 1906 sufficiently distant from any elements of a host device with which PCMCIA device 1900 is used to avoid undue interference from chassis structures or other RF interfering aspects of a host device. A representative such displacement in the case of a wireless device used with a laptop computer is on the order of one-fourth of the wavelength of the lowest frequency handled by the antenna ($0.25\lambda_L$). The ovoid dipole construction of antenna 1906 has a feed structure according to the teachings of the present invention and its construction is particularly amenable to wireless communications with a host device, such as a laptop computer, using impulse radio communications. Manufacture of antenna 1906 is easily accomplished by establishing radiating elements 1910, 1912 as planar ovoidal radiating elements on a flexible substrate, and then rolling the flexible substrate to form cylindrical substrate 1908.

Spheroidal and ovoidal monopoles and dipoles have significant advantages over traditional antennas:

Compact size: at the low frequency limit, the span of the radiating elements is only about $\lambda/6$ to $\lambda/10$, often under half the size of the $\sim\lambda/4$ elements normally expected to be required for efficient radiation. This small size also helps the antenna to be non-dispersive, and thus well suited for short pulse transmission.

Well matched and efficient: spheroidal and ovoidal antennas can easily achieve VSWR's on the order of 2:1 or better. Some designs exhibit VSWR's as low as 1.2:1 across much of the band. This means that antennas have an efficiency of at least 90% to as high as 99%. These excellent matches over a large bandwidth mean that reflections (and hence, ringing) are minimized, despite the fact that no resistive loading is employed. These values are all matched to a 50Ω system, eliminating the need for an expensive broadband balun transformer.

Broadband: spheroidal and ovoidal antennas have fractional bandwidths of as much as 120%, i.e. covering two octaves. Fractional bandwidth is defined:

$$BW\% = \frac{BW_{3dB}}{f_C} = \frac{f_U - f_L}{\frac{1}{2}(f_U + f_L)}$$

where $BW_{3dB}$ is the 3 dB bandwidth, $f_C$ is the center frequency, $f_U$ is the upper frequency, and $f_L$ is the lower frequency.

Omni-directional:

spheroidal and ovoidal antennas have omni-directional patterns.

Ease of Manufacture:

a spheroidal monopole may be manufactured on a flat ground plane making it much easier to manufacture than a volcano smoke antenna or other spheroidal antenna. While both spheroidal dipoles and monopoles may be constructed from wire frame or plate type elements, ovoidal antennas are even more straightforward and simple in their manufacture.

Stable Gain:

Unlike most ultra wideband (UWB) antennas which exhibit an increasing gain with frequency, the gain of spheroidal and ovoidal antennas is remarkably stable across the performance band.

FIG. 20 is a table summarizing performance of various antennas vis-à-vis criteria considered important for a commercially successful impulse radio communication system. In FIG. 20, a variety of antennas are listed in the leftmost column. Arrayed for each antenna listed in the leftmost column are "YES" or "NO" comments for each of the following criteria: well-matched (i.e., to 50 ohms), efficient, non-dispersive, omni-directional, easy to make and small (i.e., compact). By inspection of FIG. 20 one can observe that the CEO (i.e., circular, elliptical, oval) ovoidal planar antennas are the only antennas that indicate a "YES" for all categories. Spheroidal antennas are the only antennas that indicate only one "NO" among the important criteria indicated.

The favored antennas for impulse radio communication applications are ovoidal or spheroidal antennas that are fed at a "blunt" feed juncture having curvature in the area of feed junction, as described hereinbefore in detail, especially in connection with FIGS. 14-19. The feed structure employed may be coaxial cable, transmission line, twisted pair or other configurations of feed structure. The inventor has learned that it matters little whether the antenna is three-dimensional (i.e., spheroidal) or planar (i.e., CEO, or ovoidal). Moreover, it matters little whether the antenna shape is wholly "filled in" or merely outlines or circumscribes the intended shape of the embodiment employed by using mesh structure, plurality of plates (parallel or intersecting), or another approximation of the desired antenna shape. Radio communication performance varies somewhat among the various preferred embodiments, but not appreciably; other considerations than RF performance may dictate which embodiment to employ. Such other considerations may include cost, ease of manufacture, size, weight, robustness, aesthetics or other non-RF performance factors.

The most preferred embodiment is a planar elliptical dipole with elements aligned along the semi-minor axes and with about a 3:2 ratio between the semi-major and semi-minor axes.

Because the antennas disclosed in the present invention are capable of radiating very short, non-time-dispersive pulses, they are ideal for use in an array. Conventional elements in arrays exhibit undesirable grating lobes as later lobes of a pulse waveform interfere with earlier lobes. The antennas that are the subject of the present disclosure can emit short non-time-dispersive pulses that significantly mitigate the grating lobe problem.

Such short pulse waveforms allow the antennas of the present invention to be advantageously used in conjunction with corner, planar, convex cylindrical or concave cylindrical reflectors. When conventional antennas are used in a reflector, defocusing leads to undesired grating lobes. The short, non-time-dispersive pulses of the antennas of the present invention allow a reflected waveform to be defocused without leading to the grating lobes experienced when using conventional antennas. Defocusing a waveform without creating grating lobes permits higher gain and directivity than are achievable using prior art antenna elements.

Figure 21:
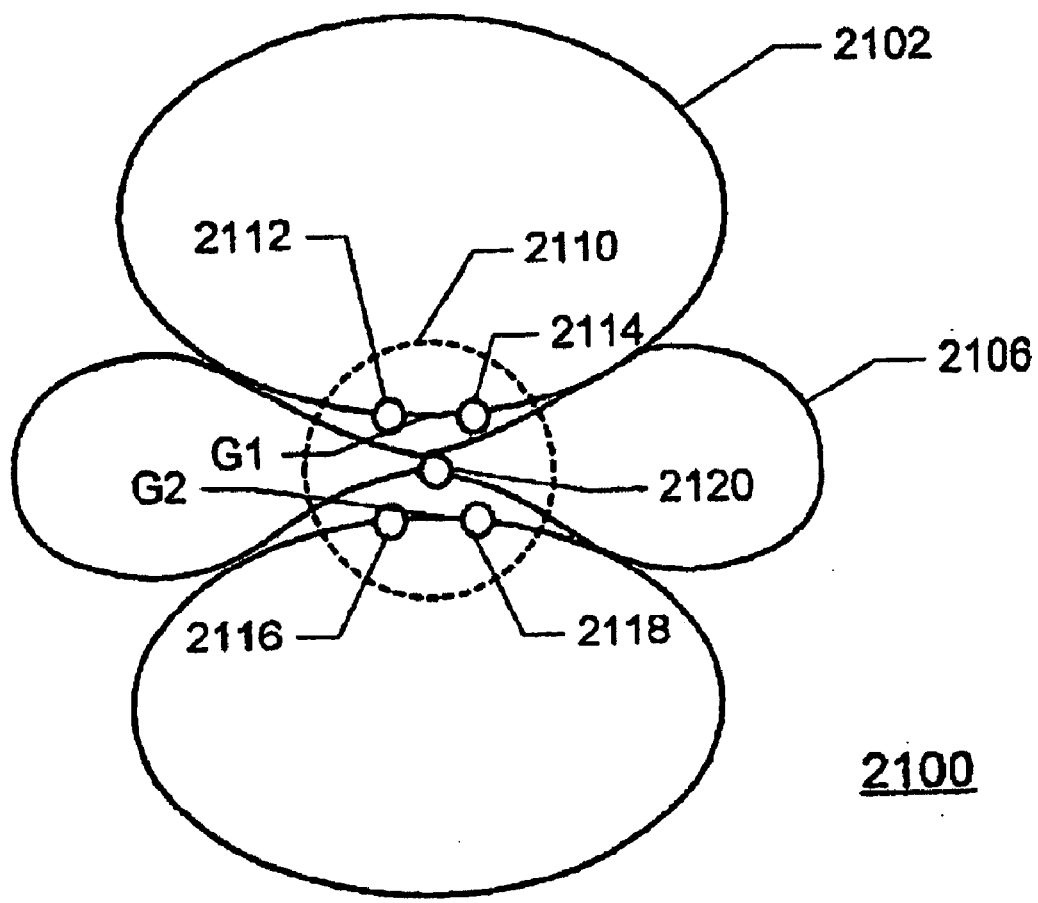
FIG. 21 is a plan view of a schematic representation of a quadropole planar antenna according to the present invention.

FIG. 21 is a plan view of a schematic representation of a quadropole planar antenna according to the present invention. In FIG. 21, a quadropole antenna 2100 includes a first radiating element 2102, a second radiating element 2104 and a third radiating element 2106. A feed region 2110 includes connection points 2112, 2114 associated with first radiating element 2102; connection points 2114, 2114 associated with second radiating element 2104; and connection point 2120 associated with third radiating element 2106. In an exemplary operational employment, in which antenna 2100 is, by way of example, connected with a coaxial cable, connection points 2112, 2114, 2116, 2118 may be connected with the grounding sheath of the coaxial cable (not shown in FIG. 21). In such an exemplary arrangement, connection point 2120 would be connected with the center pin of the coaxial cable (not shown in FIG. 21). Antenna 2100 thus has two gaps. Gap G1 is established between ground pin connections 2112, 2114 and center pin connection 2120. Gap G2 is established between ground pin connections 2116, 2118 and center pin connection 2120. Antenna 2100 is characterized by four beams of radiation in the plane of antenna 2100.

Antennas constructed according to the teachings of the present invention have been observed to exhibit stable radiation patterns over at least a 4:1 bandwidth. That is, such antennas have a fractional bandwidth of at least 120%. Larger bandwidths are possible, but the radiation pattern of antennas having larger bandwidths will change at higher frequencies. For example, a dipole antenna radiation pattern within a particular bandwidth may shift to radiating in a quadropole antenna pattern at frequencies higher than the upper limit of the particular bandwidth.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for transferring electromagnetic energy intermediate a host device and a medium adjacent to the apparatus in an impulse radio system; the apparatus comprising:

(a) an energy guiding means for guiding said electromagnetic energy, said energy guiding means being connected with said host device;

(b) an electromagnetic energy channeling structure, said electromagnetic energy channeling structure effecting said transferring and including a plurality of gap interfaces; and (c) a transition means for coupling said energy guiding means with said plurality of gap interfaces; said transition means conveying said electromagnetic energy intermediate said energy guiding means and in said plurality of gap interfaces;

each respective interface of said plurality of gap interfaces intersecting said transition means in an intersection; said intersection being a substantially continuous curve in planes intersecting said respective gap interface and said transition means.

2. An apparatus for transferring electromagnetic energy intermediate a host device and a medium adjacent to the apparatus in an impulse radio system as recited in claim 1 wherein said at least one gap interface is one gap interface.

3. An apparatus for transferring electromagnetic energy intermediate a host device and a medium adjacent to the apparatus in an impulse radio system as recited in claim 1 wherein said at least one gap interface is two gap interfaces; said two gap interfaces being substantially symmetrical about an axis in respective planes of said selected planes.

4. An apparatus for transferring electromagnetic energy intermediate a host device and a medium adjacent to the apparatus in an impulse radio system as recited in claim 2 wherein said electromagnetic channeling structure comprises a monopole ellipsoid structure.

5. An apparatus for transferring electromagnetic energy intermediate a host device and a medium adjacent to the apparatus in an impulse radio system as recited in claim 3 wherein said electromagnetic channeling structure comprises a dipole ellipsoid structure separated by a gap.

6. An apparatus for transferring electromagnetic energy intermediate a host device and a medium adjacent to the apparatus in an impulse radio system as recited in claim 1 wherein said electromagnetic channeling structure comprises at least one planar elliptical structure.

7. An apparatus for transferring electromagnetic energy intermediate a host device and a medium adjacent to the apparatus in an impulse radio system as recited in claim 3 wherein said electromagnetic channeling structure comprises a planar dipole elliptical structure.

8. An apparatus for transmitting and receiving electromagnetic energy intermediate a host radio and a medium adjacent to the apparatus in an impulse radio system; the apparatus comprising:

(a) an energy guiding means for guiding said electromagnetic energy, said energy guiding means being connected with said host radio;

(b) an electromagnetic energy channeling structure, said electromagnetic energy channeling structure effecting said transferring and including a plurality of gap interfaces; and (c) a transition means for coupling said energy guiding means with said plurality of gap interfaces; said transition means conveying said electromagnetic energy intermediate said energy guiding means and in said plurality of gap interfaces;

each respective gap interface of and plurality of gap interfaces intersecting said transition means in an intersection; said intersection being a substantially continuous curve in planes intersecting said respective gap interface and said transition means; said curve extending a distance beyond said intersection in said selected planes.

9. An apparatus for transferring electromagnetic energy intermediate a host device and a medium adjacent to the apparatus in an impulse radio system as recited in claim 8 wherein said at least one gap interface is one gap interface.

10. An apparatus for transferring electromagnetic energy intermediate a host device and a medium adjacent to the apparatus in an impulse radio system as recited in claim 8 wherein said at least one gap interface is two gap interfaces; said two gap interfaces being substantially symmetrical about an axis in respective planes of said selected planes.

11. An apparatus for transferring electromagnetic energy intermediate a host device and a medium adjacent to the apparatus in an impulse radio system as recited in claim 9 wherein said electromagnetic channeling structure comprises a monopole ellipsoid structure.

12. An apparatus for transferring electromagnetic energy intermediate a host device and a medium adjacent to the apparatus in an impulse radio system as recited in claim 10 wherein said electromagnetic channeling structure comprises a dipole ellipsoid structure separated by gap.

13. An apparatus for transferring electromagnetic energy intermediate a host device and a medium adjacent to the apparatus in an impulse radio system as recited in claim 9 wherein said electromagnetic channeling structure comprises a planar monopole elliptical structure.

14. An apparatus for transferring electromagnetic energy intermediate a host device and a medium adjacent to the apparatus in an impulse radio system as recited in claim 10 wherein said electromagnetic channeling structure comprises a planar dipole elliptical structure.

15. A dipole antenna for transmitting and receiving radio energy between said transceiver and a medium adjacent to the antenna; the antenna comprising:

(a) a radio energy guiding means for guiding said radio energy to and from said transceiver; said radio guiding means being connected with said transceiver;

(b) a radio signal energy channeling structure for effecting said transmitting and said receiving; said radio signal energy channeling structure including a plurality of gap interfaces; and (c) a transition means for coupling said radio energy guiding means with said plurality of gap interfaces; said transition means conveying said radio energy intermediate said radio energy guiding means and in said plurality of gap interfaces;

each respective gap interface of said plurality of gap interfaces intersecting said transition means in an intersection; said intersection being a substantially continuous curve in planes intersecting said respective gap interface and said transition means.

16. A dipole antenna for transmitting and receiving radio energy between said transceiver and a medium adjacent to the antenna as recited in claim 15 wherein said radio energy guiding means comprises a first ellipsoid structure and a second ellipsoid structure; said first ellipsoid structure having a first origin and said second ellipsoid structure having a second origin; said first ellipsoid structure having a first major axis and a first minor axis in a plane intersecting said first origin and said second origin; said second ellipsoid structure having a second major axis and a second minor axis in said plane; said first ellipsoid structure extending a first axial distance along one axis of said first major axis and said first minor axis in said plane from said first origin; said second ellipsoid structure extending a second axial distance along one axis of said second major axis and said second minor axis in said plane from said second origin; said first origin and said second origin being separated in said plane by a distance equal to said first axial distance plus said second axial distance plus a gap distance.

17. A monopole antenna for use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver; said impulse radio energy guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said radio energy guiding means and in said at least one gap interface;

respective gap interface of said plurality of gap interfaces intersecting said transition means in an intersection; said intersection being a substantially continuous curve in planes intersecting said respective gap interface and said transition means.

18. A monopole antenna for use with an impulse radio transceiver for transmitting and receiving impulse radio energy between said transceiver and a medium adjacent to the antenna as recited in claim 17 wherein said impulse radio energy guiding means comprises an ellipsoid structure and a low potential structure generally neighboring said ellipsoid structure; said low potential structure being substantially symmetric about a first plane; said ellipsoid structure having an origin; said ellipsoid structure having a major axis and a minor axis in a second plane; said second plane containing said origin and intersecting said first plane in a line; said ellipsoid structure extending an axial distance along one axis of said major axis and said minor axis in said second plane from said origin; said origin and said line being separated in said second plane by a distance equal to said axial distance plus a gap distance.

19. A dipole antenna for transmitting and receiving radio energy between said transceiver and a medium adjacent to the antenna as recited in claim 15 wherein said radio energy guiding means comprises a first ellipse structure and a second ellipse structure; said first ellipse structure and said second ellipse structure being substantially in a common plane; said first ellipse structure having a first origin and said second ellipse structure having a second origin; said first ellipse structure having a first major axis and a fist minor axis in said plane; said second ellipse structure having a second major axis and a second minor axis in said plane; said first ellipse structure extending a fist axial distance along one axis of said first major axis and said first minor axis in said plane from said first origin; said second ellipse structure extending a second axial distance along one axis of said second major axis and said second minor axis in said plane from said second origin; said first origin and said second origin being separated said plane by a distance equal to said first axial distance plus said second axial distance plus a gap distance.

20. A monopole antenna or use with an impulse radio transceiver for transmitting and receiving impulse radio energy between said transceiver and a medium adjacent to the antenna as recited in claim 17 wherein said impulse radio energy guiding means comprise an ellipse structure and a low potential structure generally neighboring said ellipse structure; said low potential structure being substantially symmetric about a first plane; said ellipse structure having an origin; said ellipse structure having a major axis an a minor axis in a second plane; said second plane containing said or origin and intersecting said first plane in a line; said ellipse structure extending an axial distance along one axis of said major axis and said minor axis in said second plane from said origin; said origin and said line being separated in said second plane by a distance equal to said axial distance plus a gap distance.

21. A dipole antenna for transmitting and receiving radio energy between said transceiver and a medium adjacent to the antenna as recited in claim 15 wherein said radio energy guiding means comprises a first polyhedral structure and a second polyhedral structure; said first polyhedral structure having a first center of gravity and a first volume; said second polyhedral structure having a second center of gravity and a second volume; said first ellipsoid structure extending a first lateral distance from said first center of gravity toward said second center of gravity in a plane containing said first center of gravity and said second center of gravity; said second polyhedral structure extending a second lateral distance from said second center of gravity toward said first center of gravity in said plane; said first center of gravity and said second center of gravity being separated in said plane by a distance equal to said first lateral distance plus said second lateral distance plus a gap distance.

22. A monopole antenna or use with an impulse radio transceiver for transmitting and receiving impulse radio energy between said transceiver and a medium adjacent to the antenna as recited in claim 17 wherein said impulse radio energy guiding means comprise a polygonal structure and a low potential structure generally neighboring said polygonal structure; said low potential structure being substantially symmetric about a first plane; said polygonal structure having a center of gravity contained in a said second plane; said second plane intersecting said first plane in a line; said polygonal structure extending a lateral distance from said center of gravity toward said first plane in said second plane; said center of gravity and said line being separated in said second plane by a distance equal to said lateral distance plus a gap distance.

23. A dipole antenna for transmitting and receiving radio energy between said transceiver and a medium adjacent to the antenna as recited in claim 16 wherein at least one of said first ellipsoid structure and said second ellipsoid structure is configured of an electrically conductive mesh shell.

24. A dipole antenna for transmitting and receiving radio energy between said transceiver and a medium adjacent to the antenna as recited in claim 16 wherein at least one of said first ellipsoid structure and said second ellipsoid structure being a pseudo-ellipsoid structure; said pseudo-ellipsoid structure being configured of a plurality of substantially parallel planar structures; each respective planar structure of said plurality of planar structure circumscribing a respective perimeter of a respective planar section of an ellipsoid; said respective perimeters established by said respective planar structures cooperating to approximately circumscribe an ellipsoid in space.

25. A dipole antenna for transmitting and receiving radio energy between said transceiver and a medium adjacent to the antenna as recited in claim 16 wherein at least one of said first ellipsoid structure and said second ellipsoid structure is a pseudo-ellipsoid structure; said pseudo-ellipsoid structure being configured of a plurality of substantially parallel planar structures; each respective planar structure of said plurality of planar structure circumscribing a respective solid planar section of an ellipsoid; said respective solid planar sections of said respective planar structures cooperating to approximately circumscribe an ellipsoid in space.

26. A dipole antenna for transmitting and receiving radio energy between said transceiver and a medium adjacent to the antenna as recited in claim 19 wherein at least one of said first ellipse structure and said second ellipse structure is a pseudo-ellipse structure; said pseudo-ellipse structure being configured as a line of electrically conductive material substantially circumscribing an ellipse in said common plane.

27. A monopole antenna for use with an impulse radio transceiver for transmitting and receiving impulse radio energy between said transceiver and a medium adjacent to the antenna as recited in claim 20 wherein said ellipse structure is a pseudo-ellipse structure; said pseudo-ellipse structure being configured as a line of electrically conductive material substantially circumscribing an ellipse in said second plane.

28. A dipole antenna for use with an impulse radio transceiver for transmitting and receiving impulse radio energy between said transceiver and a medium adjacent to the antenna the antenna comprising:
   (a) an impulse radio energy guiding means for guiding said impulse radio energy of and from said transceiver; said impulse radio guiding means being connected with said transceiver;
   (b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and in said plurality of gap interfaces; each respective gap interface of said plurality of gap interfaces intersecting said transition means in an intersecting; said intersection being a substantially continuous curve in planes intersecting said respective gap interface and said transition means.

29. A dipole antenna for use with an impulse radio transceiver for transmitting and receiving impulse radio energy between said transceiver and a medium adjacent to the antenna as recited in claim 28 wherein said impulse radio energy guiding means comprises a first ellipsoid structure and a second ellipsoid structure; said first ellipsoid structure having a first origin and said second ellipsoid structure having a second origin; said first ellipsoid structure having a first major axis and a first minor axis in a plane intersecting said first origin and said second origin; said second ellipsoid structure having a second major axis and a second minor axis in said plane; said first ellipsoid structure extending a first axial distance along one axis of said first major axis and said first minor axis in said plane from said first origin; said second ellipsoid structure extending a second axial distance along one axis of said second major axis and said second minor axis in said plane from said second origin; said first origin and said second origin being separated in said plane by a distance equal to said first axial distance plus said second axial distance plus gap distance.

30. A dipole antenna for use with an impulse radio transceiver for transmitting and receiving impulse radio energy between said transceiver and a medium adjacent to the antenna as recited in claim 28 wherein said impulse radio energy guiding means comprises a first polyhedral structure and a second polyhedral structure; said first polyhedral structure having a first center of gravity and a first volume; said second polyhedral structure having a second center of gravity and a second volume; said first ellipsoid structure extending a first lateral distance from said first center of gravity toward said second center of gravity in a plane containing said first center of gravity and said second center of gravity; said second polyhedral structure extending a second lateral distance from said second center of gravity toward said first center of gravity in said plane; said first center of gravity and said second center of gravity being separated in said plane by a distance equal to said first lateral distance plus said second lateral distance pulse a gap distance.

31. A dipole antenna for use with an impulse radio transceiver for transmitting and receiving impulse radio energy between said transceiver and a medium adjacent to the antenna as recited in claim 29 wherein at least one of said first ellipsoid structure and said second ellipsoid structure is configured of an electrically conductive mesh shell.

32. A dipole antenna for use with an impulse radio transceiver for transmitting and receiving impulse radio energy between said transceiver and a medium adjacent to the antenna as recited in claim 29 wherein at least one of said first ellipsoid structure and said second ellipsoid structure being a pseudo-ellipsoid structure; said pseudo-ellipsoid structure being configured of a plurality of substantially parallel planar structures; each respective planar structure of said plurality of planar structures circumscribing a respective perimeter of a respective planar section of an ellipsoid; said respective perimeters established by said respective planar structures cooperating to approximately circumscribe an ellipsoid in space.

33. A dipole antenna for use with an impulse radio transceiver for transmitting and receiving impulse radio energy between said transceiver and a medium adjacent to the antenna as recited in claim 29 wherein at least one of said first ellipsoid structure and said second ellipsoid structure is a pseudo-ellipsoid structure; said pseudo-ellipsoid structure being configured of a plurality of substantially parallel planar structures; each respective planar structure of said plurality of planar structures circumscribing a respective solid planar section of an ellipsoid; said respective solid planar sections of said respective planar structures cooperating to approximately circumscribe an ellipsoid in space.

34. A dipole antenna for transmitting and receiving radio energy between said transceiver and a medium adjacent to the antenna; the antenna comprising:
   (a) a radio energy guiding means for guiding said radio energy to and from said transceiver; said radio guiding means being connected with said transceiver;
   (b) a radio signal energy channeling structure for effecting said transmitting and said receiving; said radio signal energy channeling structure including a plurality of gap interfaces; and
   (c) a transition means for coupling said radio energy guiding means with said plurality of gap interfaces; said transition means conveying said radio energy intermediate said radio energy guiding means and said plurality of gap interfaces;
each respective gap interface of said plurality of gap interfaces intersecting said transition means in an intersection; said intersection being a substantially continuous curve in selected planes intersecting said respective gap interface and said transition means; said radio energy guiding means comprising a first ellipsoid structure and a second ellipsoid structure; said first ellipsoid structure having a first origin and said second ellipsoid structure having a second origin; said first ellipsoid structure having a first major axis and a first minor axis in a plane intersecting said first origin and said second origin; said second ellipsoid structure having a second major axis and a second minor axis in said plane; said first ellipsoid structure extending a first axial distance along one axis of said first major axis and said first minor axis in said plane from said first origin; said second ellipsoid structure extending a second axial distance along one axis of said second major axis and said second minor axis in said plane from said second origin; said first origin and said second origin being separated in said plane by a distance equal to said first axial distance plus said second axial distance plus gap distance.

35. A dipole antenna for transmitting and receiving radio energy between said transceiver and a medium adjacent to the antenna as recited in claim 34 wherein at least one of said first ellipsoid structure and said second ellipsoid structure is configured of an electrically conductive mesh shell.

36. A dipole antenna for transmitting and receiving radio energy between said transceiver and a medium adjacent to the antenna as recited in claim 34 wherein at least one of said first ellipsoid structure and said second ellipsoid structure being a pseudo-ellipsoid structure; said pseudo-ellipsoid structure being configured of a plurality of substantially parallel planar structures; each respective planar structure of said plurality of planar structures circumscribing a respective perimeter of a respective planar section of an ellipsoid; said respective perimeters established by said respective planar structures cooperating to approximately circumscribe an ellipsoid in space.

37. A dipole antenna for transmitting and receiving radio energy between said transceiver and a medium adjacent to the antenna as recited in claim 34 wherein at least one of said first ellipsoid structure and said second ellipsoid structure is a pseudo-ellipsoid structure; said pseudo-ellipsoid structure being configured of a plurality of substantially parallel planar structures; each respective planar structure of said plurality of planar structures circumscribing a respective solid planar section of an ellipsoid; said respective solid planar sections of said respective planar structures cooperating to approximately circumscribe an ellipsoid in space.

38. A monopole antenna for use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver, said impulse radio energy guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and said at least one gap interface;

at least one respective gap interface of said plurality of gap interfaces intersecting said transition means in an intersection; said intersection being a substantially continuous curve in selected planes intersecting said at least one respective gap interface and said transition means; said impulse radio energy guiding means comprising an ellipsoid structure and a low potential structure generally neighboring said ellipsoid structure; said low potential structure being substantially symmetric about a first plane; said ellipsoid structure having an origin; said ellipsoid structure having a major axis and a minor axis in a second plane; said second plane containing said origin and intersecting said first plane in a line; said ellipsoid structure extending an axial distance along one axis of said major axis and said minor axis in said second plane from said origin; said origin and said line being separated in said second plane by a distance equal to said axial distance plus a gap distance.

39. A dipole antenna for transmitting and receiving radio energy between said transceiver and a medium adjacent to the antenna; the antenna comprising:

(a) a radio energy guiding means for guiding said radio energy to and from said transceiver; said radio guiding means being connected with said transceiver;

(b) a radio signal energy channeling structure for effecting said transmitting and said receiving; said radio signal energy channeling structure including a plurality of gap interfaces; and (c) a transition means for coupling said radio energy guiding means with said plurality of gap interfaces; said transition means conveying said radio energy intermediate said radio energy guiding means and said plurality of gap interfaces;

each respective gap interface of said plurality of gap interfaces intersecting said transition means in an intersection; said intersection being a substantially continuous curve in selected planes intersecting said respective gap interface and said transition means; said radio energy guiding means comprising a first ellipse structure and a second ellipse structure; said first ellipse structure and said second ellipse structure being substantially in a common plane; said first ellipse structure having a first origin and said second ellipse structure having a second origin; said first ellipse structure having a first major axis and a fist minor axis in said plane; said second ellipse structure having a second major axis and a second minor axis in said plane; said first ellipse structure extending a first axial distance along one axis of said first major axis and said first major axis in said plane from said first origin; said second ellipse structure extending a second major axial distance along one axis of said second major axis and said second minor axis in said plane from said second origin; said first origin and said second origin being separated in said plane by a distance equal to said first axial distance plus said second axial distance plus a gap distance.

40. A dipole antenna for transmitting and receiving radio energy between said transceiver and a medium adjacent to the antenna as recited in claim 39 wherein at least one of said first ellipse structure and said second ellipse structure is a pseudo-ellipse structure; said pseudo-ellipse structure being configured as a line of electrically conductive material substantially circumscribing an ellipse in said common plane.

41. A monopole antenna for use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver; said impulse radio energy guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and said at least one gap interface;

at least one respective gap interface of said plurality of gap interfaces intersecting said transition means in an intersection; said intersection being a substantially continuous curve in selected planes intersecting said at least one respective gap interface and said transition means; said impulse radio energy guiding means comprising an ellipse structure and a low potential structure generally neighboring said ellipse structure; said low potential structure being substantially symmetric about a first plane; said ellipse structure having an origin; said ellipse structure having a major axis and a minor axis in a second plane; said second plane containing said origin and intersecting said first plane in a line; said ellipse structure extending an axial distance along one axis of said major axis and said minor axis in said second plane from said origin; said origin and said line being separated in said second plane by a distance equal to said axial distance pulse a gap distance.

42. A monopole antenna for use with an impulse radio transceiver for transmitting and receiving impulse radio energy between said transceiver and a medium adjacent to the antenna as recited in claim 41 wherein said ellipse structure is a pseudo-ellipse structure; said pseudo-ellipse structure being configured as a line of electrically conductive material substantially circumscribing an ellipse in said second plane.

43. A dipole antenna for transmitting and receiving radio energy between said transceiver and a medium adjacent to the antenna; the antenna comprising:

(a) a radio energy guiding means for guiding said radio energy to and from said transceiver; said radio guiding means being connected with said transceiver;

(b) a radio signal energy channeling structure for effecting said transmitting and said receiving; said radio signal energy channeling structure including a plurality of gap interfaces; and (c) a transition means for coupling said radio energy guiding means with said plurality of gap interfaces; said transition means conveying said radio energy intermediate said radio energy guiding means and said plurality of gap interfaces;

each respective gap interface of said plurality of gap interfaces intersecting said transition means in an intersection; said intersection being a substantially continuous curve in selected planes intersecting said respective gap interface and said transition means; said radio energy guiding means comprising a first polyhedral structure and a second polyhedral structure; said first polyhedral structure having a first center of gravity and a first volume; said second polyhedral structure having a second center of gravity and a second volume; said first ellipsoid structure extending a first lateral distance from said first center of gravity toward said second center of gravity in a plane containing said first center of gravity and said second center of gravity; said second polyhedral structure extending a second lateral distance from said second center of gravity toward said first center of gravity in said plane; said first center of gravity and said second center of gravity being separated in said plane by a distance equal to said first lateral distance plus said second lateral distance plus a gap distance.

44. A monopole antenna or use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver; said impulse radio energy guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and said at least one gap interface;

at least one respective gap interface of said plurality of gap interfaces intersecting said transition means in an intersection; said intersection being a substantially continuous curve in selected planes intersecting said at least one respective gap interface and said transition means; said impulse radio energy guiding means comprising a polygonal structure and a low potential structure generally neighboring said polygonal structure; said low potential structure being substantially symmetric about a first plane; said polygonal structure having a center of gravity contained in a said second plane; said second plane intersecting said first plane in a line; said polygonal structure extending a lateral distance from said center of gravity toward said first plane in said second plane; said center of gravity and said line being separated in said second plane by a distance equal to said lateral distance plus a gap distance.

45. A dipole antenna for use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver; said impulse radio guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and said plurality of gap interfaces;

each respective gap interface of said plurality of gap interfaces intersecting said transition means in an intersection; said intersection being a substantially continuous curve in selected planes intersecting said respective gap interface and said transition means; said impulse radio energy guiding means comprising a first ellipsoid structure and a second ellipsoid structure; said first ellipsoid structure having a first origin and said second ellipsoid structure having a second origin; said first ellipsoid structure having a first major axis said a first minor axis in a plane intersecting said first origin and said second origin; said second ellipsoid structure having a second major axis and a second minor axis in said plane; said first ellipsoid structure extending a first axial distance along one axis of said first major axis and said first minor axis in said plane from said first origin; said second ellipsoid structure extending a second axial distance along one axis of said second major axis and said second minor axis in said plane from said second origin; said first origin and said second origin being separated in said plane by a distance equal to said first axial distance plus said second axial distance plus a gap distance.

46. A dipole antenna for use with an impulse radio transceiver for transmitting and receiving impulse radio energy between said transceiver and a medium adjacent to the antenna as recited in claim 45 wherein at least one of said first ellipsoid structure and said second ellipsoid structure is configured of an electrically conductive mesh shell.

47. A dipole antenna for use with an impulse radio transceiver for transmitting and receiving impulse radio energy between said transceiver and a medium adjacent to the antenna recited in claim 45 wherein at least one of said first ellipsoid structure and said second chips ellipsoid structure being a pseudo-ellipsoid structure; said pseudo-ellipsoid structure being configured of a plurality of substantially parallel planar structures; each respective planar structure of said plurality of planar structures circumscribing a respective perimeter of a respective planar section of an ellipsoid; sad respective perimeters established by said respective planar structures cooperating to approximately circumscribe an ellipsoid in space.

48. A dipole antenna for use with an impulse radio transceiver for transmitting and receiving impulse radio energy between said transceiver and a medium adjacent to the antenna as recited in claim 45 wherein at least one of said first ellipsoid structure and said second ellipsoid structure is a pseudo-ellipsoid structure; said pseudo-ellipsoid structure being configured of a plurality of substantially parallel planar structures; each respective planar structure of said plurality of planar structures circumscribing a respective solid planar section of an ellipsoid; said respective solid planar sections of said respective planar structures cooperating to approximately circumscribe an ellipsoid in space.

49. A dipole antenna for use with an impulse radio transceiver for transmitting and receiving impulse radio energy between said transceiver and a medium adjacent to the antenna; the antenna comprising:

(a) an impulse radio energy guiding means for guiding said impulse radio energy to and from said transceiver; said impulse radio guiding means being connected with said transceiver;

(b) an impulse radio signal energy channeling structure for effecting said transmitting and said receiving; said impulse radio signal energy channeling structure including a plurality of gap interfaces; and (c) a transition means for coupling said impulse radio energy guiding means with said plurality of gap interfaces; said transition means conveying said impulse radio energy intermediate said impulse radio energy guiding means and said plurality of gap interfaces;

each respective gap interface of said plurality of gap interfaces intersecting said transition means in an intersection; said intersection being a substantially continuous curve in selected planes intersecting said respective gap interface and said transition means; said impulse radio energy guiding means comprising a first polyhedral structure and a second polyhedral structure; said first polyhedral structure having a first center of gravity and a first volume; said second polyhedral structure having a second center of gravity and a second volume; said first ellipsoid structure extending a first lateral distance from said first center of gravity toward said second center of gravity in a plane containing said first center of gravity and said second center of gravity; said second polyhedral structure extending a second lateral distance from said second center of gravity toward said first center of gravity in said plane; said first center of gravity and said second center of gravity being separated in said plane by a distance equal to said first lateral distance plus said second lateral distance plus a gap distance.

50. A dipole antenna for use with an impulse radio transceiver for transmitting and receiving impulse radio energy between said transceiver and a medium adjacent to the antenna as recited in claim 49 wherein at least one of said first ellipse structure and said second ellipse structure is a pseudo-ellipse structure; said pseudo-ellipse structure being configured as a line of electrically conductive material substantially circumscribing an ellipse in said common plane.

* * * * *